US005928291A

United States Patent [19]

Jenkins et al.

[11] Patent Number: 5,928,291

[45] Date of Patent: Jul. 27, 1999

[54] MILEAGE AND FUEL CONSUMPTION DETERMINATION FOR GEO-CELL BASED VEHICLE INFORMATION MANAGEMENT

[75] Inventors: Paul C. Jenkins; David V. Deal; Thomas G. Cuthbertson; Andrew D. Smith; David R. Hoy; Gerald W. Egeberg, all of Cedar Rapids, Iowa

[73] Assignee: Rockwell International Corporation, Costa Mesa, Calif.

[21] Appl. No.: 08/828,017

[22] Filed: Mar. 27, 1997

[51] Int. Cl.$^{6}$ .......... G06F 19/00

[52] U.S. Cl. .......... 701/1; 701/35; 701/123

[58] Field of Search .......... 701/1, 29, 35, 701/123, 213; 340/438, 439, 459, 521; 364/479.1; 377/20

[56] References Cited

U.S. PATENT DOCUMENTS

| | | | |
|---|---|---|---|
| 4,630,292 | 12/1986 | Juricich | 340/459 |
| 4,677,429 | 6/1987 | Glotzbach | 340/521 |
| 5,359,528 | 10/1994 | Haendel et al. | 340/438 |
| 5,579,233 | 11/1996 | Burns | 364/479.1 |
| 5,612,875 | 3/1997 | Haendel et al. | 701/35 |

*Primary Examiner*—Gary Chin
*Attorney, Agent, or Firm*—Kyle Eppele; James P. O'Shaughnessy

[57] ABSTRACT

A commercial vehicle fleet management system which integrates a vehicle on-board computer, a precise positioning system, and communication system to provide automated calculating and reporting of jurisdictional fuel taxes, road use taxes, vehicle registration fees, and the like. Also disclosed is an online mobile communication system and a system for monitoring carrier vehicle efficiency and vehicle and driver performance.

11 Claims, 22 Drawing Sheets

Microfiche Appendix Included
(3 Microfiche, 208 Pages)

MILEAGE AND FUEL CONSUMPTION DETERMINATION FOR GEO-CELL BASED VEHICLE INFORMATION MANAGEMENT

RELATED CASES

This application is related to application Ser. Nos. 08/828,015 (Attorney Docket No. 97CR033/MLM) and 08/828,016 (Attorney Docket No. 97CR034/MLM), both filed on even date herewith, both of which are incorporated by reference in their entireties.

STATEMENT UNDER 37 C.F.R. "1.71(d) AND (e)

A portion of the disclosure of this patent document contains material which is subject to copyright protection. The copyright owner has no objection to the facsimile reproduction by anyone of the patent document or the patent disclosure, as it appears on the Patent and Trademark Office patent file or records, but otherwise reserves all copyrights whatsoever.

MICROFICHE APPENDIX

The present application contains a microfiche appendix of a computer program listing for partial operation of the invention described herein, said appendix includes three microfiche sheets and 208 frames.

TECHNICAL FIELD

The present invention relates generally to carrier vehicle management devices and, more particularly, to an improved carrier vehicle management system employing vehicle position information.

BACKGROUND OF THE INVENTION

Presently, there exists no system for integrating and automating the various communication, record keeping, vehicle maintenance, and route management needs of commercial vehicle fleet operators. For example, DOT log book records may be stored on a portable or on-board computer. Haendel et al., in U.S. Pat. No. 5,359,528, hereby incorporated by reference in its entirety, discloses a vehicle monitoring system using a satellite positioning system for recording the number of miles driven in a given state for purposes of apportioning road use taxes. Also, cellular telephone communication and other wireless mobile communication systems have improved the communication between a vehicle operator and a central dispatcher. However, there still exists a need for a single, comprehensive vehicle management system that can integrate all aspects of commercial fleet operators.

SUMMARY OF THE INVENTION

It is, therefore, an object of the present invention to provide a commercial vehicle fleet management system which integrates a vehicle on-board computer, a precise positioning system, and communication system to provide automated calculating and reporting of jurisdictional fuel taxes, road use taxes, vehicle registration fees, and the like.

It is another object of the present invention to provide a system which allows for driver and vehicle performance and evaluation.

It is another object of the present invention to provide a system that allows a commercial fleet operator, and the customers thereof, to monitor the position of a given shipment.

It is another object of the present invention to provide a system for aiding in accident reconstruction or accident investigation.

It is yet another object of the present invention to provide a system which automates all other aspects of a commercial fleet operation, such as scheduling of routine maintenance, vehicle operator payroll, hours on service or mileage limitation compliance, DOT log books, inventory control, speed, engine RPM, braking, and other vehicle parameters, route analysis, pick up and delivery scheduling, fuel consumption and efficiency, border crossings, driver error, data transfer, safety, security, etc.

A first aspect of the present invention employs position information and geographical database information to calculate and automate reporting of fuel tax and vehicle registration fees.

A second aspect of the present invention employs position information, geographical database information and vehicle operational parameters to calculate and automate vehicle operator logs, operator and vehicle performance and efficiency, route analysis, vehicle operator payroll, hours on service (HOS) compliance, etc.

A third aspect of the present invention employs vehicle position information and a communication system for increasing the efficiency of a commercial vehicle operation.

BRIEF DESCRIPTION OF THE DRAWINGS

The detailed description of the invention may be best understood when read in reference to the accompanying drawings wherein:

FIG. 4 shows an embodiment of the present invention wherein route analysis may be employed to direct a driver to an appropriate service center for refilling, servicing, and the like.

DETAILED DESCRIPTION OF THE INVENTION

Although the invention is primarily described with respect to the commercial trucking industry it is understood that the system according to the present invention may likewise be advantageously employed in other air, water, or land based vehicle operations. Also, the system can likewise advantageously be employed in non-commercial vehicles for calculating, reporting, and paying road tolls and the like.

Figure 1:
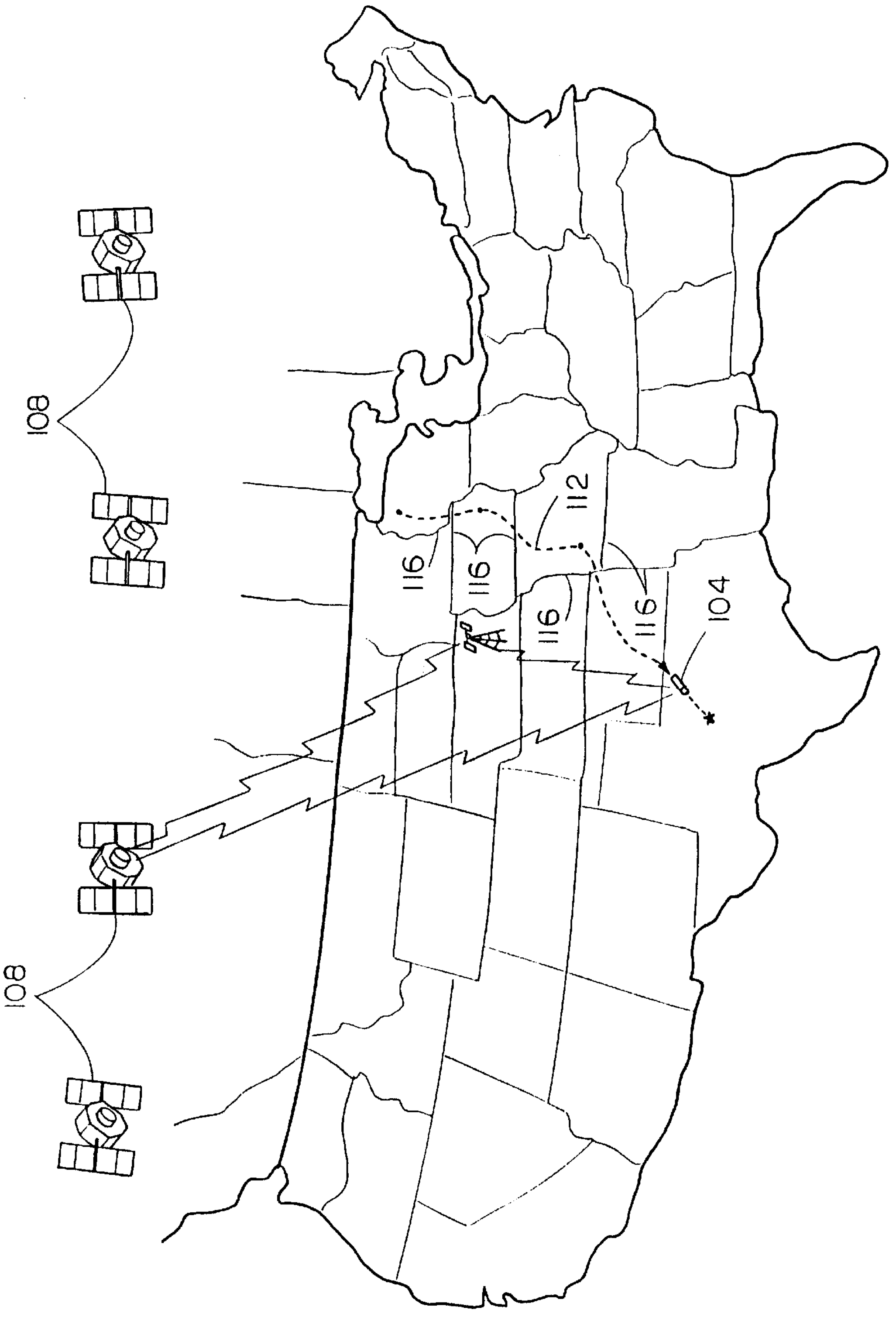
FIG. 1 shows a preferred embodiment of the present invention wherein a satellite based positioning system is employed to monitor vehicle position.

Referring now to FIG. 1, there is shown a diagrammatic representation of a commercial vehicle 104 employing a precise positioning means on board (not shown). Although the depicted embodiment in FIG. 1 depicts the use of a satellite 108 based positioning service such as GPS and the like, it will be understood by those skilled in the art that the present invention is not limited to any particular positioning means, and other positioning devices may also be used as an alternative to, or in addition to, satellite based positioning, such as LORAN, OMEGA, and the like. By continuously determining position at periodic intervals, a vehicle path 112 can be calculated and stored in memory.

The present invention allows position data to be used in conjunction with miles traveled (e.g., based on odometer readings), gas mileage, and a database stored in memory which contains information such as jurisdictional boundaries to correlate vehicle path 112 with border crossing events as vehicle 104 crosses jurisdictional borders 116, thereby automating the calculation and reporting of fuel tax apportionment among various jurisdictions (e.g., under the International Fuel Tax Agreement (IFTA)), vehicle registration fee apportionment (e.g., under the International Registration Plan (IRP)). Additionally, any other jurisdiction-specific road use taxes, vehicle entrance fees, e.g., tolls, based on vehicle weight, number of axles, etc., may likewise be computed and reported. Since border crossing is monitored, payment or reporting requirements can be handled automatically, e.g., via a wireless data transmission or storage in a memory-device on-board for later batch downloading, thus eliminating the need for toll booths.

The present invention employs a database containing information corresponding to geographical location. Such location information is based on certain defined areas hereinafter termed "geo-cells." A geo-cell may be based on jurisdictional boundaries, such as country borders, state borders, or even county or city lines, etc. However, the boundaries of a given geo-cell may alternatively correspond to a division of a geographical area without regard to jurisdictional boundaries, although the jurisdictional information for any such boundaries within a given geo-cell will be stored in the database. A geo-cell may contain additional information, such as climactic conditions, landmarks, services areas, and the like.

In this manner, the use of the geo-cells allows only the database information that will be needed for a given route to be downloaded to a on-board vehicle memory device, minimizing the memory storage requirements. For example, the selection of geo-cells can be performed by route analysis software at the start of a trip. If a vehicle is rerouted while in transit, or if position tracking data indicates that a driver is about to enter a geographic area corresponding to a geo-cell for which the geo-cell data has not been downloaded, route analysis software may be used to anticipate such an event and request the appropriate data via a wireless communication link with a central dispatch office.

Figure 2:
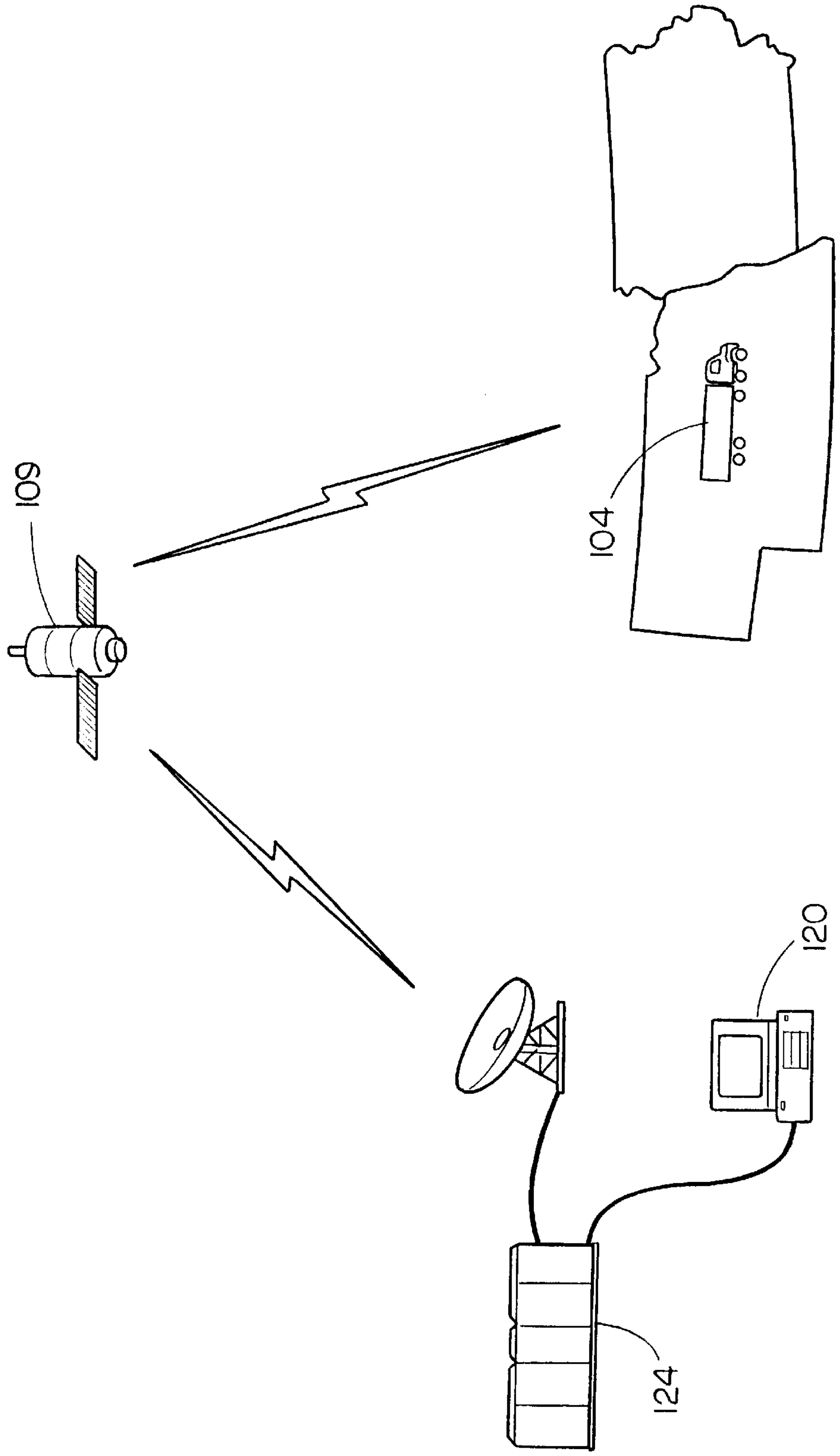
FIG. 2 shows a diagrammatic embodiment of an exemplary system according to the present invention.

FIG. 2 shows a somewhat graphical representation of an exemplary communication system according to the present invention. A transceiver (not shown) on-board a vehicle 104 allows two-way communication with a central office or dispatcher 120. Although in FIG. 2 satellite communication via satellite 109 and centrally located base station 124 is contemplated, the present invention is not limited to satellite communication links, and other forms of wireless two-way data and voice communication are likewise advantageously employed within the context of the present invention, e.g., cellular voice or data links, PCS links, radio communications, and the like.

Figure 3:
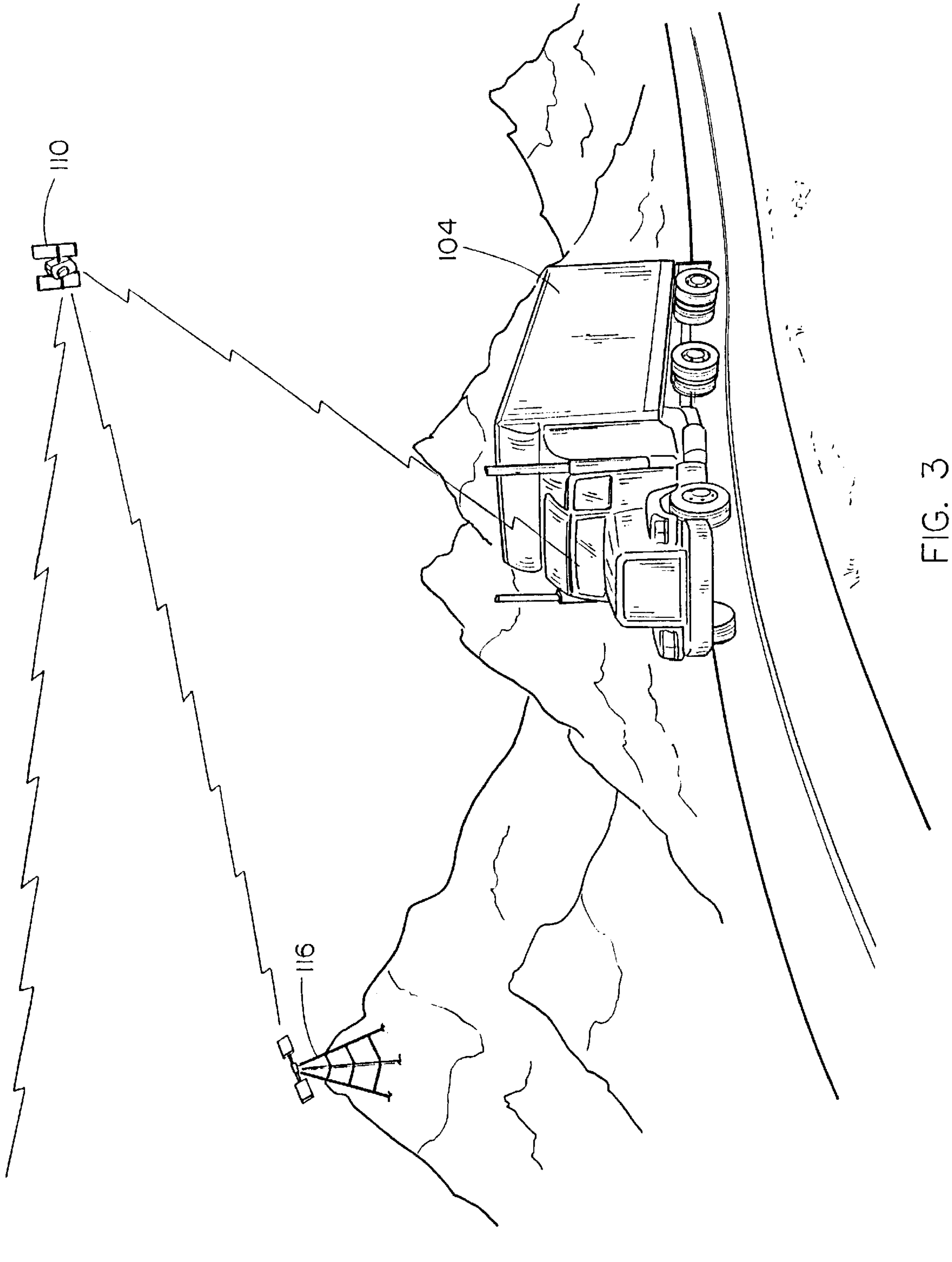
FIG. 3 shows a diagrammatic representation of truck employing the vehicle management system according to the present invention.

In a preferred embodiment, a vehicle will have the capability to communicate via satellite as well as via land based towers as depicted in FIG. 3, showing vehicle 104, tower 116, and satellite 110. In this manner, the less expensive land-based communication can be used whenever available with the more expensive satellite communication being used when necessary to maintain continuous two-way contact.

Figure 4:
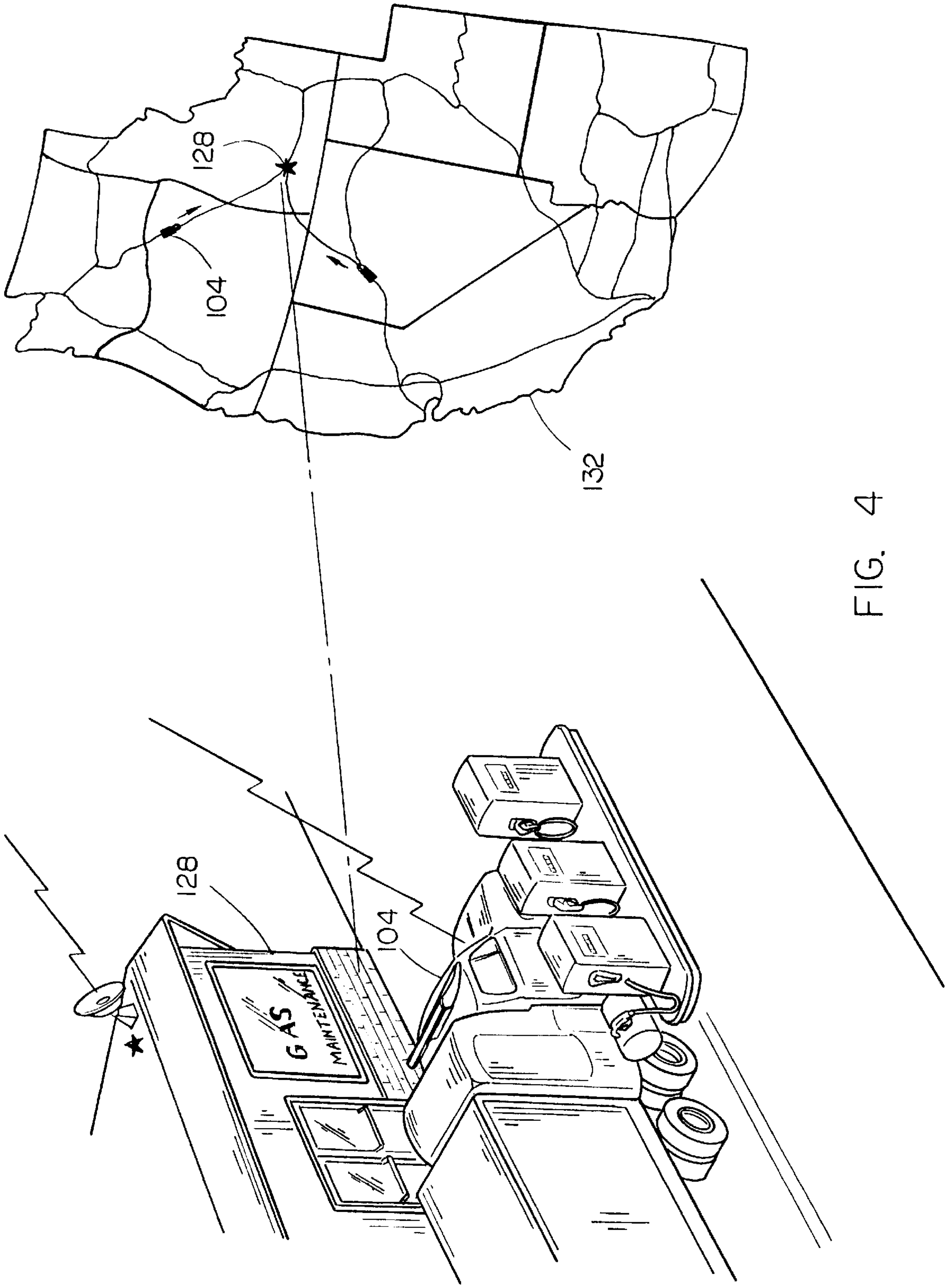

FIG. 4 depicts a vehicle 104 at a service center 128 in relation to map 132. FIG. 4 illustrates the manner in which position information may be employed to direct the vehicle operator to a given site for fuel, servicing, and the like. In this manner, an operator of a vehicle fleet, or another purchasing therefore, may purchase fuel at a discounted rate, e.g., a bulk rate or when prices are advantageous, and the vehicle operators may accordingly be instructed as to which outlets the fuel may thereafter be purchased from. Similarly, by monitoring vehicle mileage, scheduled or routine maintenance may be scheduled by the system according to the present invention and the vehicle operator informed when such servicing is due, thereby avoiding costly breakdowns.

Figure 5:
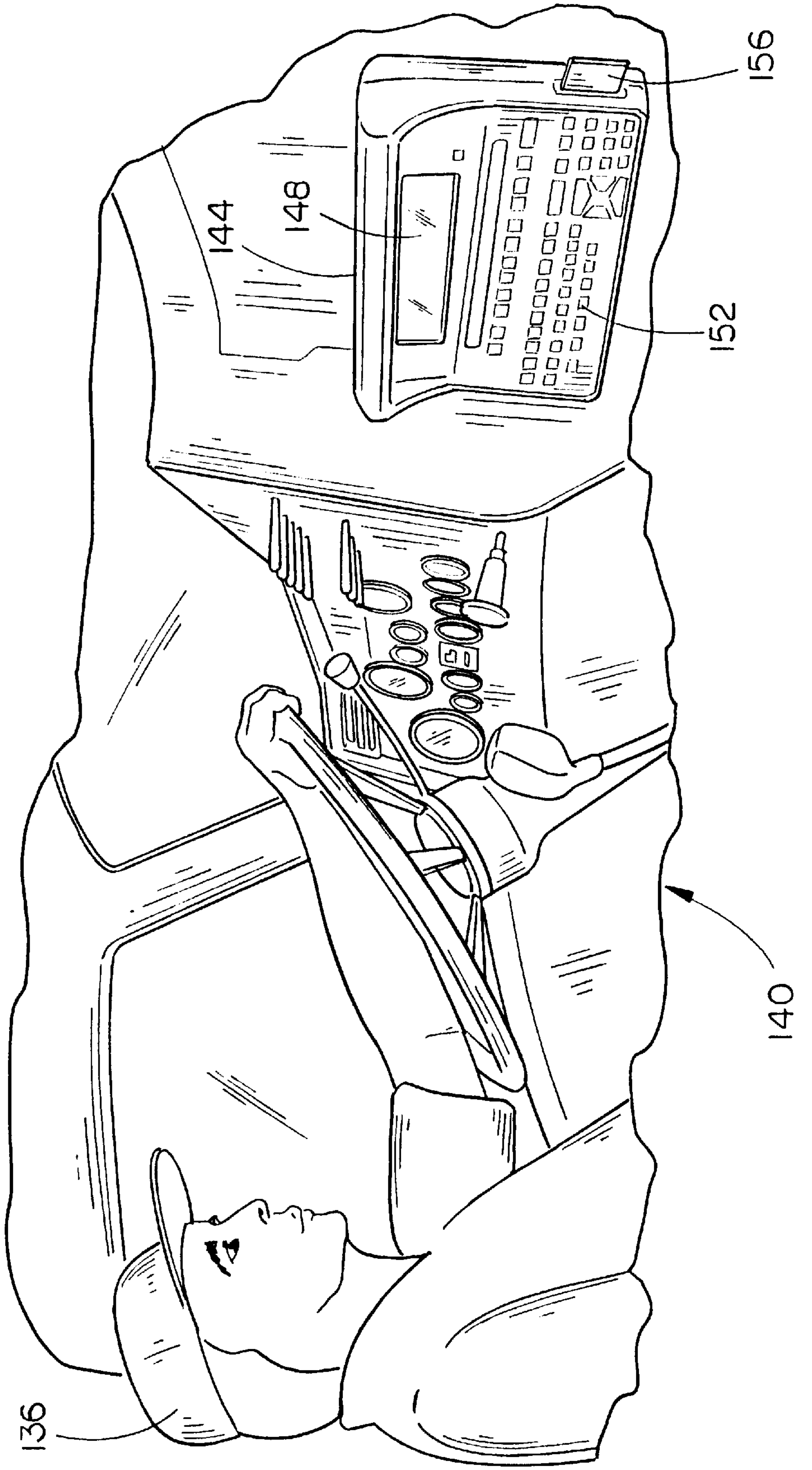
FIG. 5 shows the interior of a vehicle equipped with the system according to the present invention.

FIG. 5 shows a vehicle operator 136 and vehicle interior 140 and an exemplary embodiment of an on-board data terminal 144 useable with the system according to the present invention. In the embodiment depicted in FIG. 5, data terminal 144 comprises a display screen 148, keypad 152, and removable data storage media 156. Removable media 156 allows vehicle to vehicle transfer of trip event data for a given operator, allowing the system to prepare operator payroll, e.g., as where a driver is paid per mile driven, and can monitor compliance with HOS requirements, though the driver may operate multiple vehicles in a given time period.

Figure 6A:
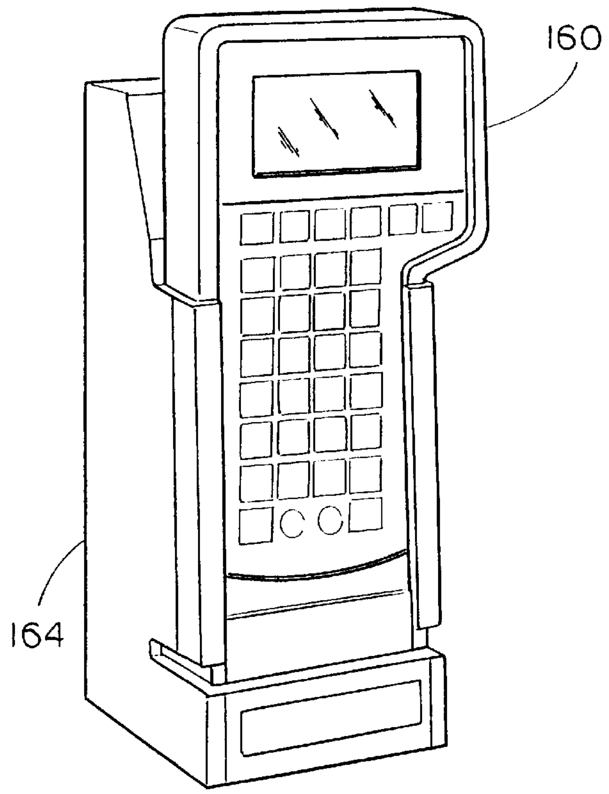
FIGS. 6A, 6B, and 6C show various embodiments of the hand-held terminals employable with the system according to the present invention.
Figure 6B:
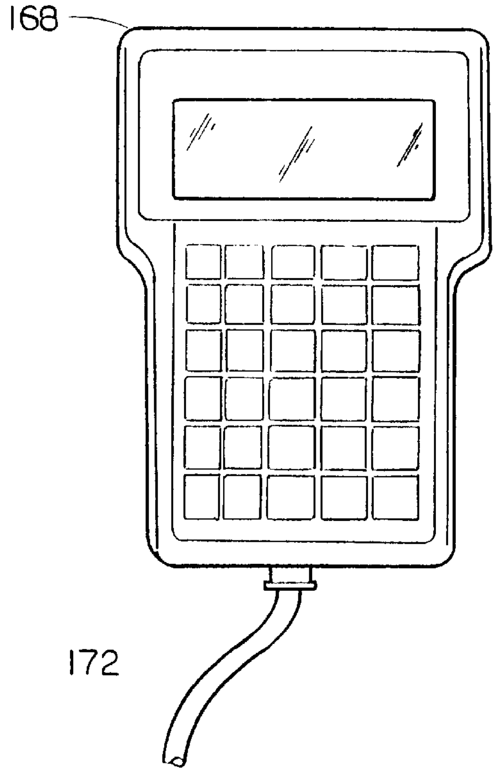
Figure 6C:
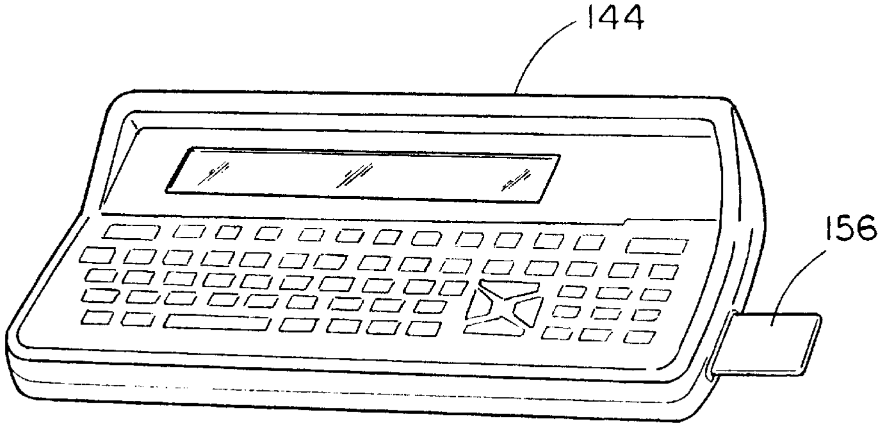

FIGS. 6A, 6B, and 6C depict alternative embodiments of vehicle mounted data terminals. FIG. 6A shows a data terminal 160 and a data terminal vehicle dock 164. Terminal 160 and docking unit 164 preferably comprise mating data and power connectors. FIG. 6B depicts a data terminal 168 and data cable 172. Each of data terminals 160 may preferably be removed and transferred from vehicle. Similarly, they may be removed from a vehicle for batch downloading at a central location. FIG. 6C depicts a data terminal 144 having removable memory card 156.

Figure 7:
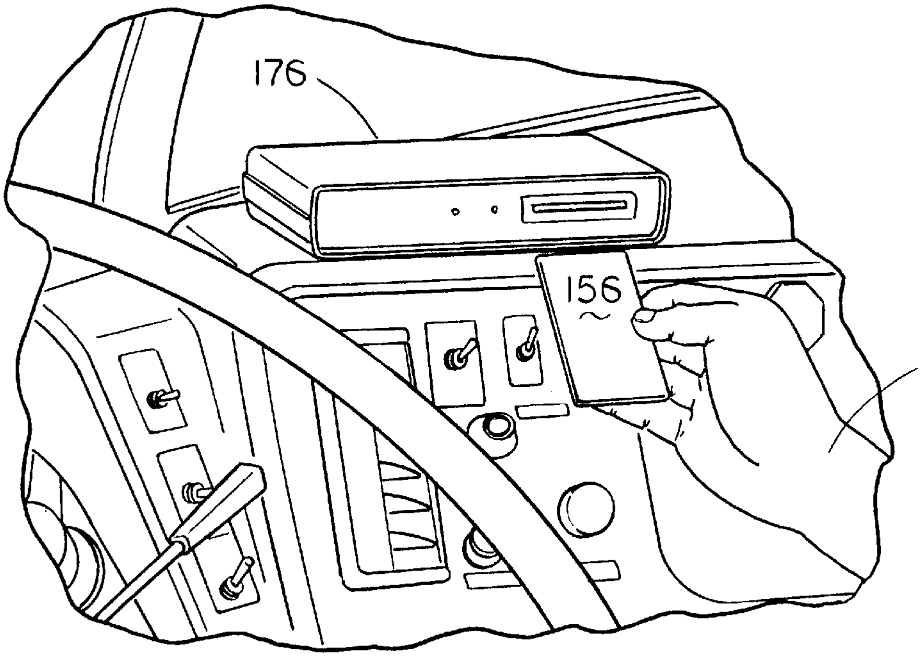
FIG. 7 shows an exemplary removable data storage media according to the present invention.

FIG. 7 shows the operation of dash mounted data terminal 176 wherein driver 136 is inserting memory card 156. The card 156 may contain the trip start and end locations, driver 136 data, route information, and the like, and may be used for storage of events, locations and associated data.

Figure 8:
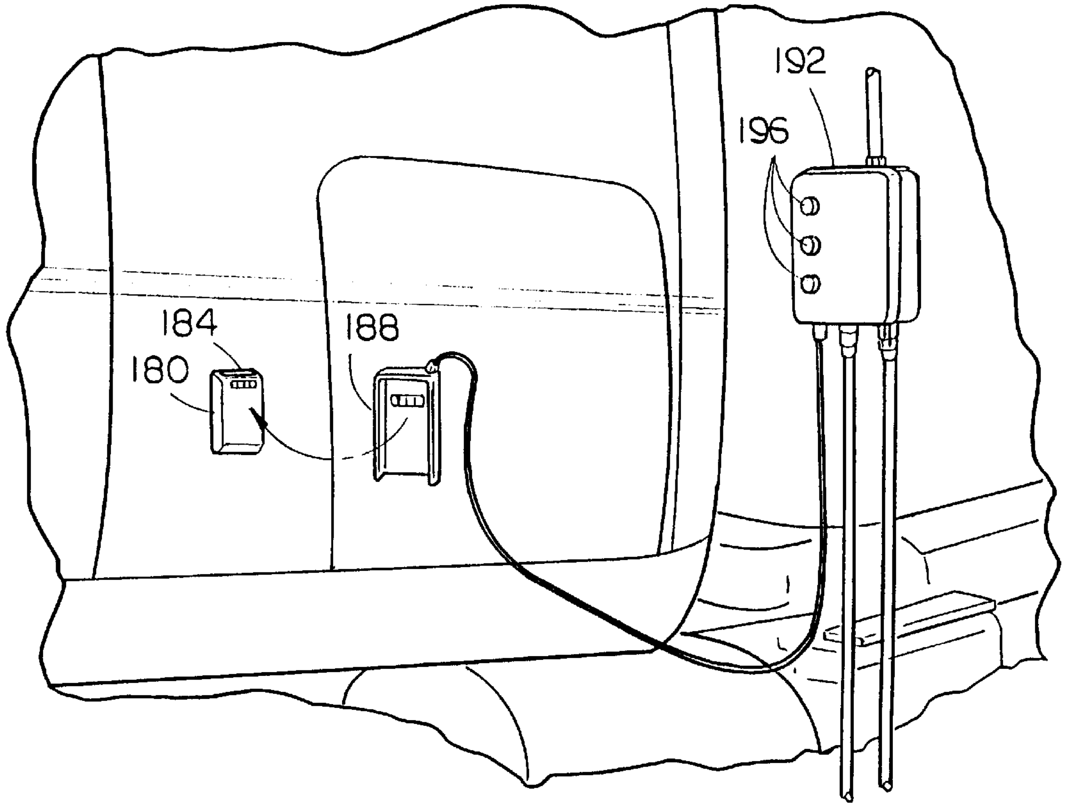
FIG. 8 shows an infra red (IR) data port mounted on the exterior of a vehicle at a data extraction station.

FIG. 8 shows the operation of a vehicle exterior data transfer pod 180 having infra red (IR) port 184 and the mating data station receptacle 188 of interface 192 of a main computer system or network (not shown). Interface 192 preferable comprises data transfer indicator lights 196 to indicate when data transfer is complete. Although an IR data port is depicted, other forms of data transfer may likewise be employed, such as radio frequency (RF) transmission, cable connection, optical, e.g., fiber optics coupling, ultra sound, and the like.

Figure 9A:
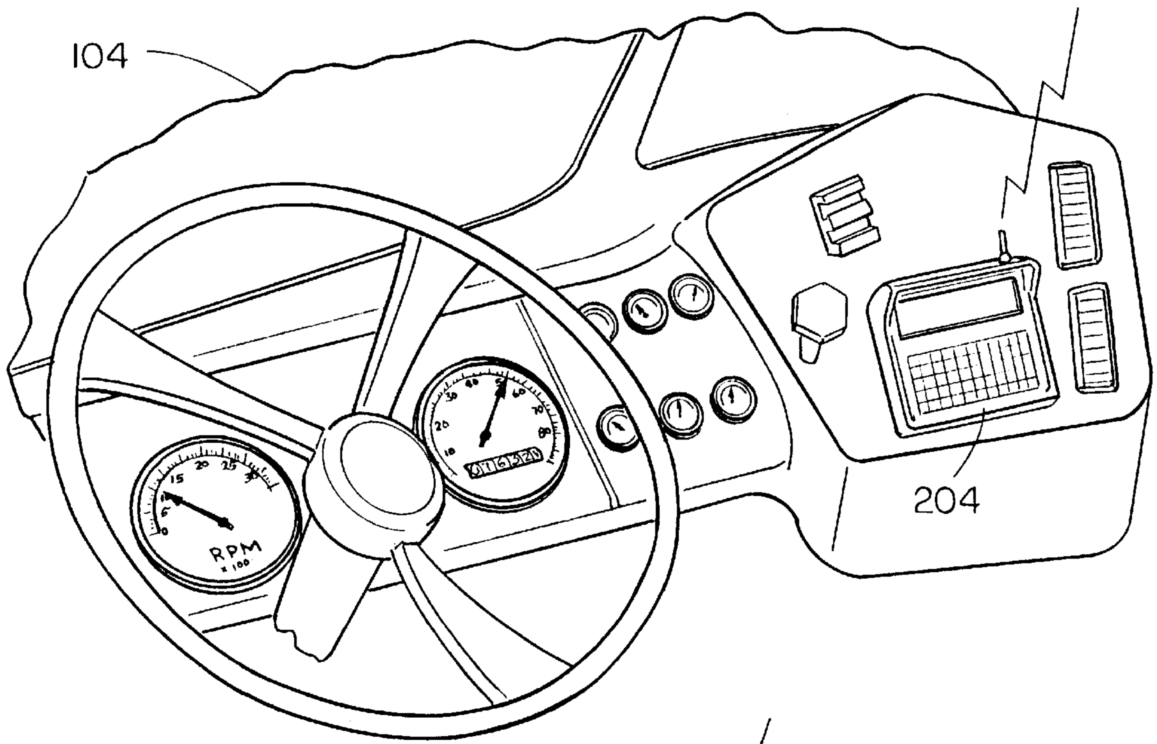
FIGS. 9A and 9B depict an exemplary embodiment of the on-board computer wherein vehicle parameters such as speed, RPM, fuel use, and the like may be monitored and stored in memory for later downloading.
Figure 9B:
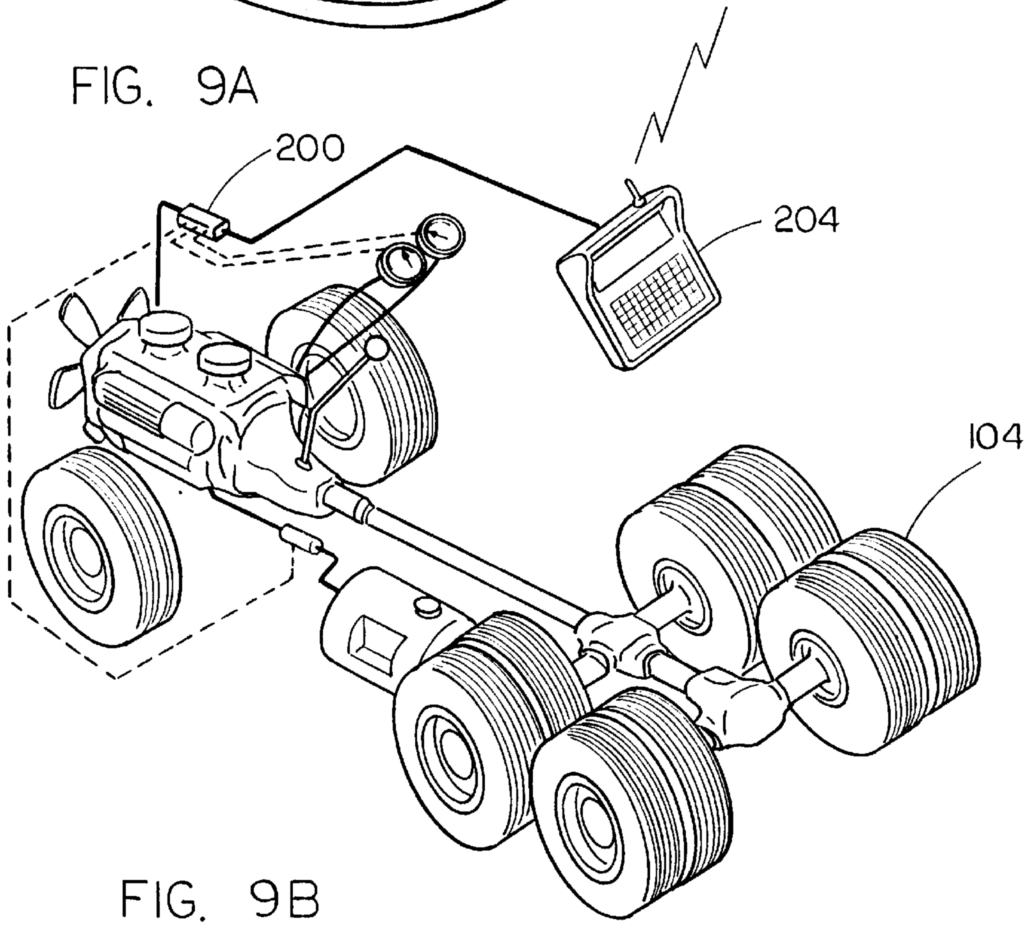

FIGS. 9A and 9B show a vehicle 104 having an on-board computer 200 with data terminal 204 whereby engine RPM, vehicle speed, and fuel consumption may be monitored and correlated with position tracking data. Vehicle 104 may also have sensors 202, which may be, for example, drive train transducers, weight sensors, and the like.

Figure 10:
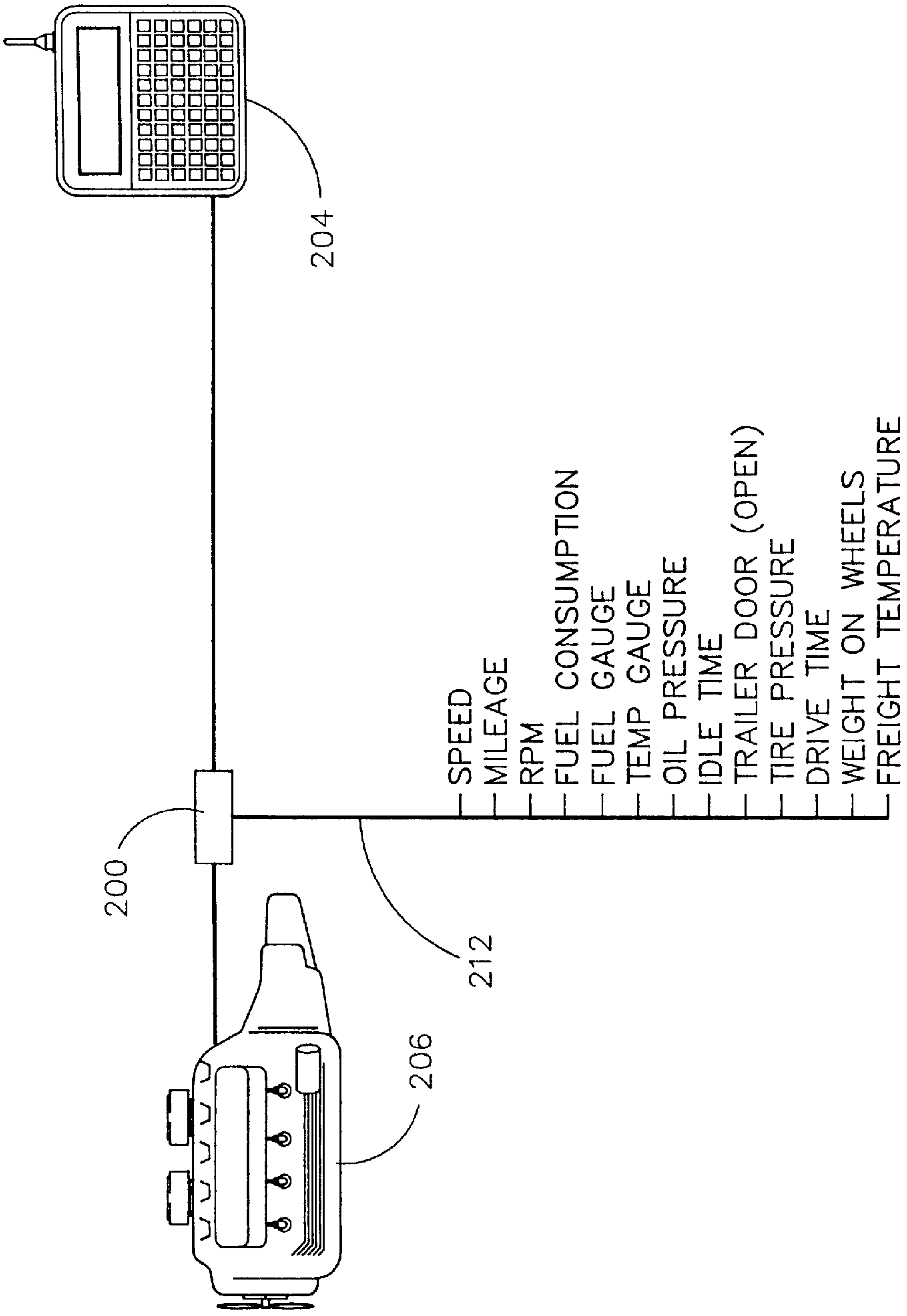
FIG. 10 depicts exemplary vehicle parameters which may be monitored and stored in memory.

FIG. 10 depicts an engine 208, on-board computer 200 and data bus 212 whereby various engine and vehicle parameters may be processed, recorded, and correlated with position tracking data.

Figure 11A:
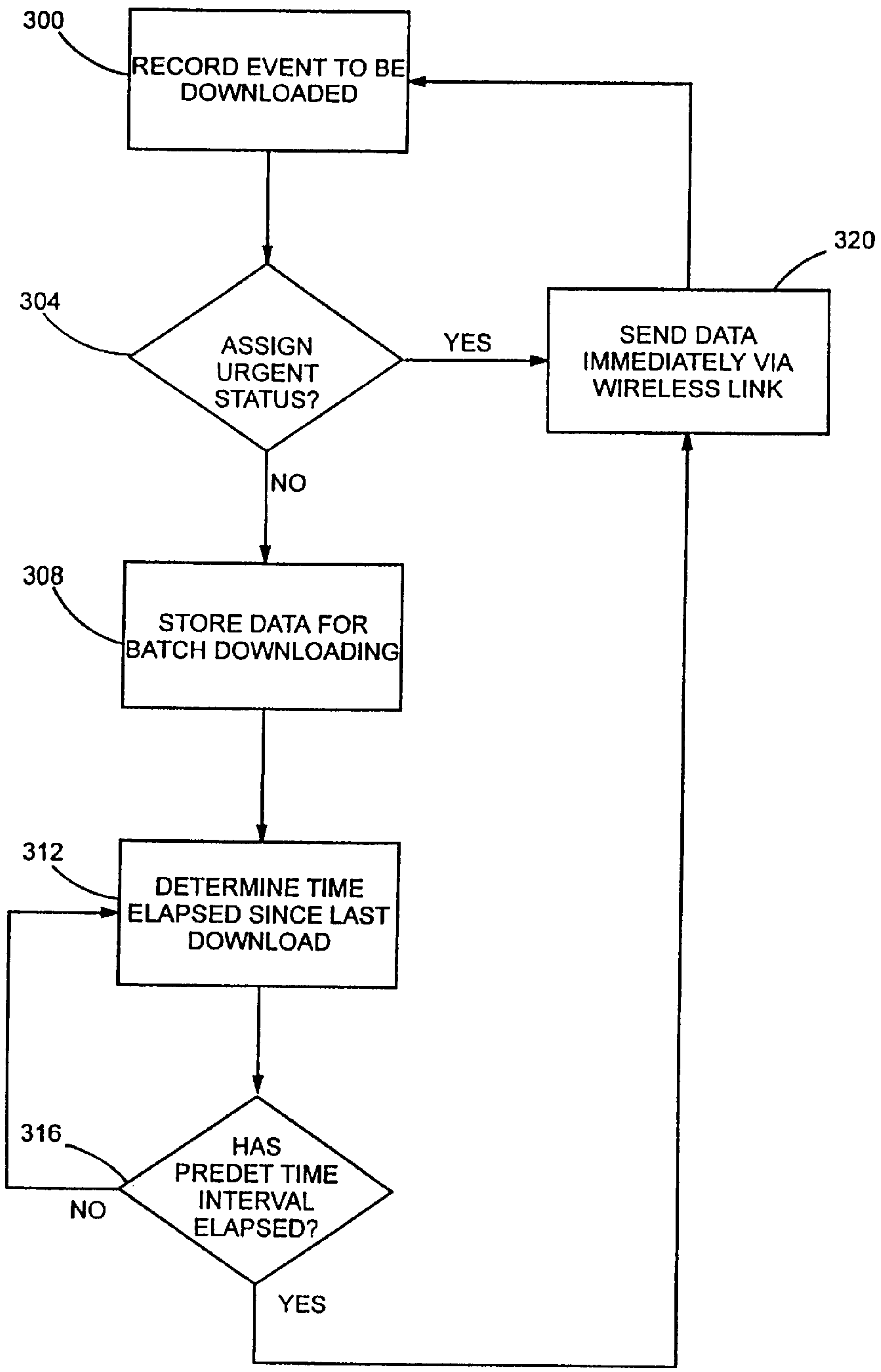
FIGS. 11A–11C show flow diagrams of preferred means for communicating data stored on-board to a central dispatcher.

FIG. 11A depicts a flowchart depicting a method for communication between a vehicle in transit and a dispatch office. In step 300 a trip event is recorded in memory. Step 304 determines whether an emergency or urgent status is warranted. Emergency status may be assigned to any predetermined event, such as accident or vehicle breakdown, and the like. Also, emergency status may be manually assigned by a vehicle operator. For example, the on-board computer system may provide a panic button or emergency button which would alert the central dispatching office. Thus, if the driver is involved in an accident, or of the driver suffers a medical emergency while driving such as a heart attack, the system according to the present invention would not only alert the dispatcher, but would also provide precise position information to allow emergency or rescue workers to reach the scene immediately.

If such an emergency or urgent status exists, then the data is sent immediately (step 320). If the event recorded in step 300 is not urgent, then it will be stored in memory for batch downloading at a later time in step 308. In this way, the number of transmissions may be reduced, and costs associated with wireless communication may thereby be reduced. Step 312 determines if the time elapsed since the last download of data reaches a certain threshold value. If a predetermined time interval since the last download have not elapsed, the system will return to step 312, which will continue until the predetermined time period has elapsed. When the time period has elapsed, recorded events stored since the last download are sent in step 320. After downloading, the program will return to step 300 and repeat.

Figures 11B, 11C:
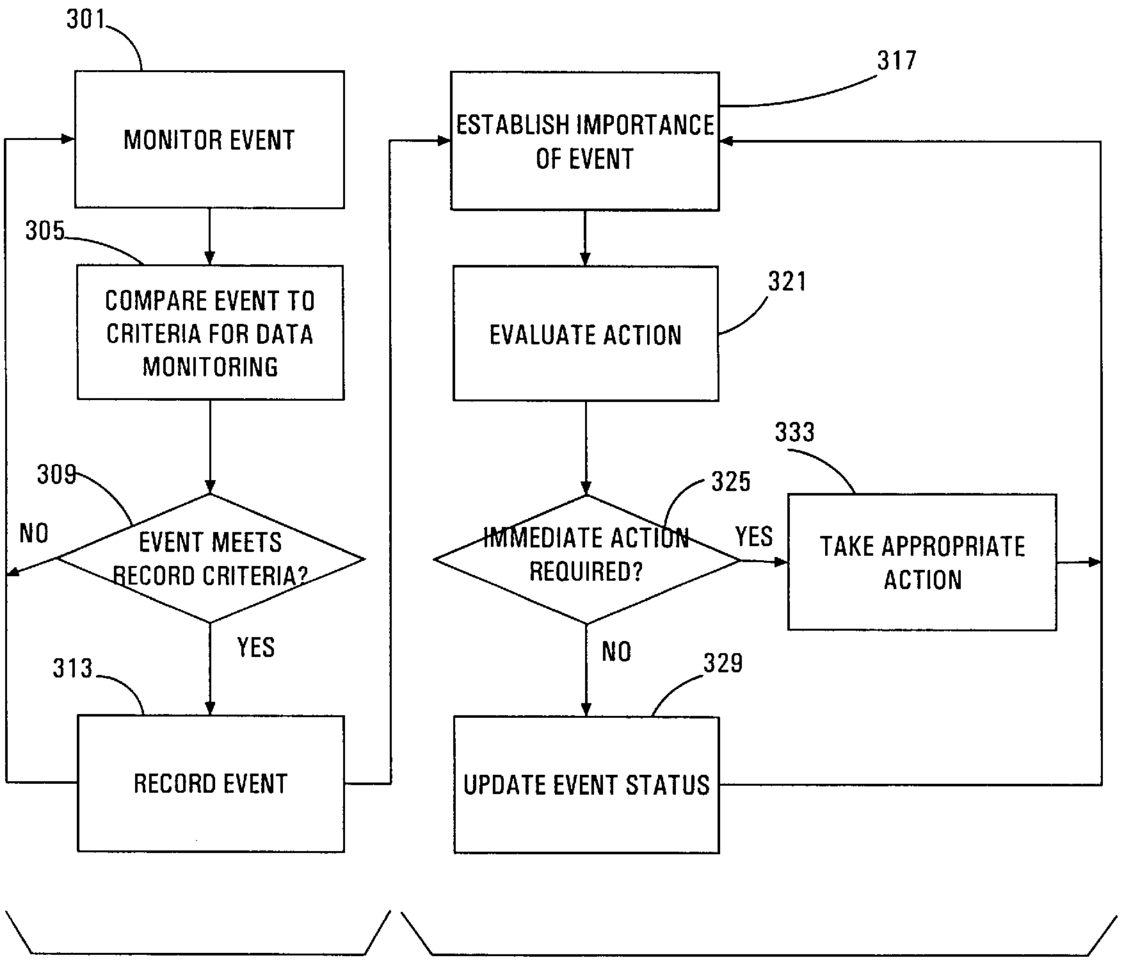

FIGS. 11B and 11C depict a preferred method for communication between a vehicle in transit and a dispatch office. In an especially preferred embodiment, the processes of FIGS. 11A and 11B are run as parallel or concurrent processes. Referring now to FIG. 11B, in step 301 trip events are monitored continuously In step 305, the monitored event is compared to preselected or predetermined criteria for data monitoring. Examples of such criteria may include, for example, state line crossing, vehicle engine parameters outside of a given range such as excessive engine RPM, excessive speed, hard braking events, delivery drop off and pick up, driving time, on-duty time, mileage events, driver errors, route changes, freight temperature, weather conditions, road closings, cost or efficiency parameters, and the like. In step 309, it is determined whether the event monitored warrants recordation. The criteria are predetermined. Some events may, for example, warrant recordation each time they occur. Examples of such events would be, for example, border crossings, loading and unloading events, change of geo-cell, accident events, emergency communications from driver, e.g., driver in trouble or vehicle breakdown events, and the like. For these events, the criteria for recording the event may be said to be the occurrence of the event itself. Other events monitored may occur continuously or too frequently for recording, i.e., dynamic events, and thus, the system may accordingly be programed to record such events upon the meeting certain criteria. For example, events such as engine RPM may be required to meet a certain range or level, e.g., in an engine idle or excessive RPM range. Other examples of such parameters include, for example, vehicle speed, mileage, driving or driver on duty time, only if they exceed a given value an emergency or urgent status is warranted. In addition to range limitations as criterial for event recording, such continuously or frequently occurring events may also be sampled at given time interval. In such cases, the criteria for recordation becomes the passage of a certain period of time since the last recordation.

If the event does not meet the predetermined criteria, it is not recorded and the program returns to step 301. If the monitored event does meet the established criteria, the event is stored in memory in step 313. The program then returns to step 301 and continues monitoring events.

Referring now to FIG. 11C, in a process that runs parallel to that depicted in FIG. 11B, the importance of the event recorded in step 313 (FIG. 11B) is established in step 317. Importance is established according to preset or preloaded fixed criteria. Event criteria importance will depend on, for example, time, distance, date, cost, resources, location, geo-cell, state line crossing, state line missed, and the like. Depending on the importance of the event recorded as determined in step 317, action to be taken is evaluated in step 321. If immediate action is required, as determined by the event importance, e.g., emergency, accident, and the like, or upon the expiration of a predetermined period of time, appropriate action will be taken in step 333. Appropriate action may be, for example, driver notification (e.g., of route change, route change, delivery of pick-up time or location change, etc.) or alerting a central dispatch office (e.g., in case of accident, breakdown, or other urgent or emergency situation), or batch wireless download of recorded data (e.g., upon expiration of a predetermined time period or other event such as the amount of data storage resources used). If immediate action is not required , the event status is updated and the program returns to step 317. Updating event status comprises logging the fact that the event was processed and establish a time or other criteria for next review. The event status may also optionally be updated at other steps in the process, including, for example, step 317, step 321, and/or step 333.

Figure 12:
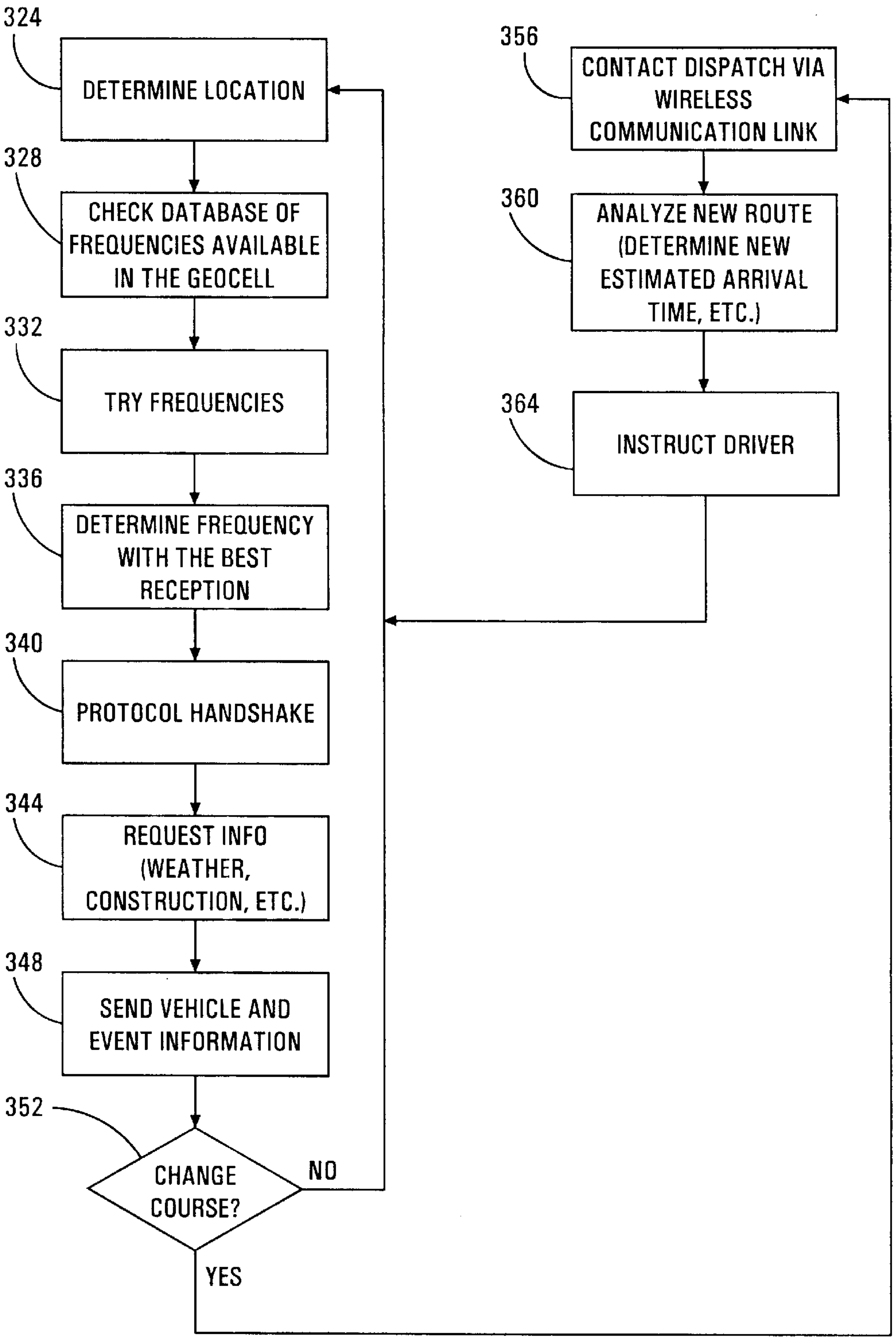
FIG. 12 show a flow diagram wherein radio frequency communication is used to for data transfer and route analysis.

FIG. 12 shows a flow diagram of the use of data sent over radio frequencies, such as public access data and the like, in conjunction with vehicle location information. In step 324, vehicle location is determined. In step 328, the geo-cell database is checked for available frequencies in the vehicle's location. The frequencies are tried in step 332 and in step 336, the best frequency is determined based on factors such as reception, cost, and the like. After handshake step 340 or the like, information is then requested in step 344. Vehicle and recorded event information may likewise be transmitted in step 348. The computer then determines whether a change of course is warranted in step 352, depending on the information received in step 344 and/or step 348 such as weather, accident, construction, or other information pertaining to traffic delays or other travel advisory information, availability of an additional load to pick up, change in delivery time or destination, etc. The determination can be made based on the availability of an alternative route or routes and a comparison of estimated arrival times based on analysis of the various alternatives. If no change is warranted, i.e., the current route is still the best option, then the program will return to step 324 and repeat. If a change of course is warranted, the dispatch office is contacted in step 356 via a wireless link, new data such as time of arrival are calculated and forwarded in step 360, and the driver is instructed as to the new route in step 364. The program then returns to step 324 and repeats.

Figure 13:
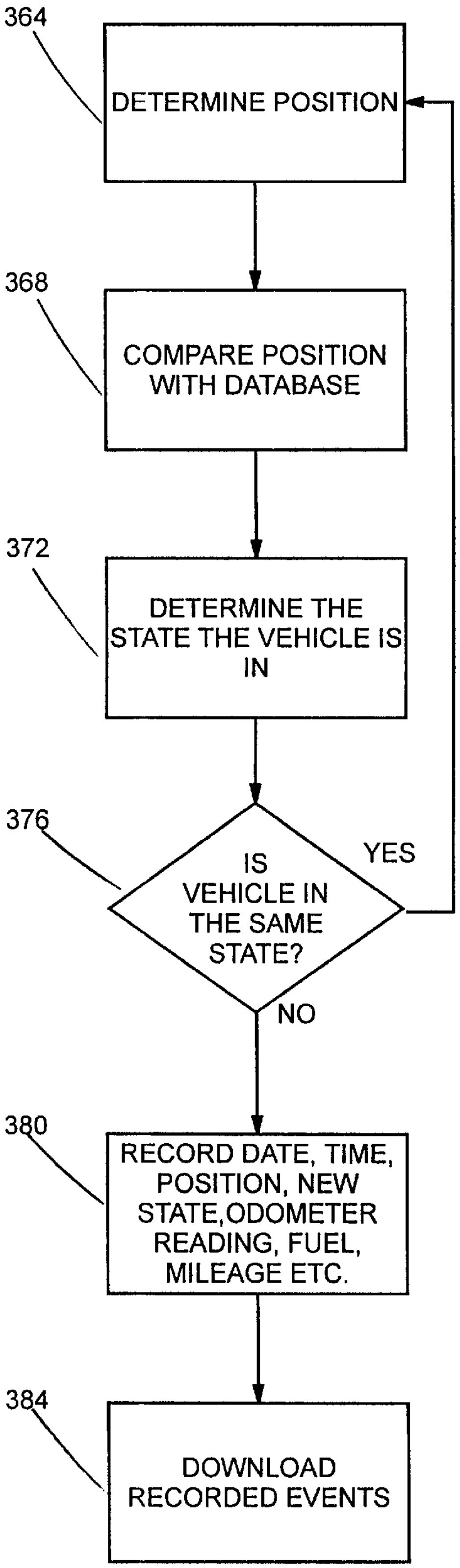
FIG. 13 shows a flow diagram for recording a jurisdiction change event and associated data.

FIG. 13 shows a flow diagram of a general method for determining when a border crossing event has occurred. In step 364, the position of the vehicle is determined. In step 368, the determined position is compared with a database containing jurisdictional boundary information and the jurisdiction, e.g., state, country, etc., is determined in step 372. In step 376, it is determined whether the vehicle is in the same jurisdiction as it was during the last calculation and comparison. If the vehicle is in the same jurisdiction, a crossing must have occurred and the border crossing event is recorded in step 380, along with associated data such as date, time, new state, mileage, fuel consumption, fuel taxes paid and/or owed, and the like. The process is then performed again from step 364. At certain intervals, the recorded events are downloaded to a central dispatch office via wireless link in step 384.

Figure 14:
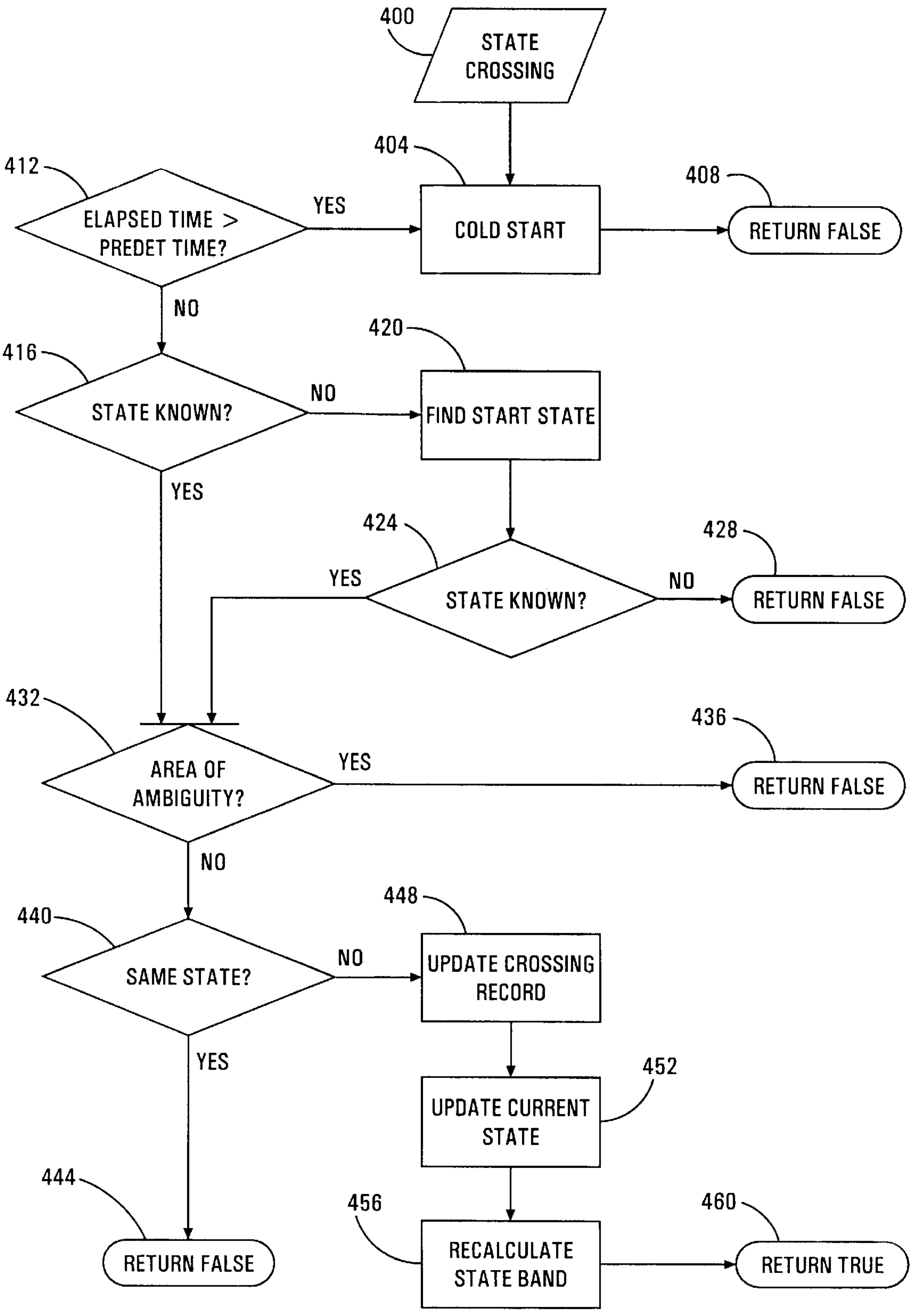
FIGS. 14 and 15 shows a somewhat more elaborate flow diagram for monitoring jurisdictional line crossings.
Figure 15:
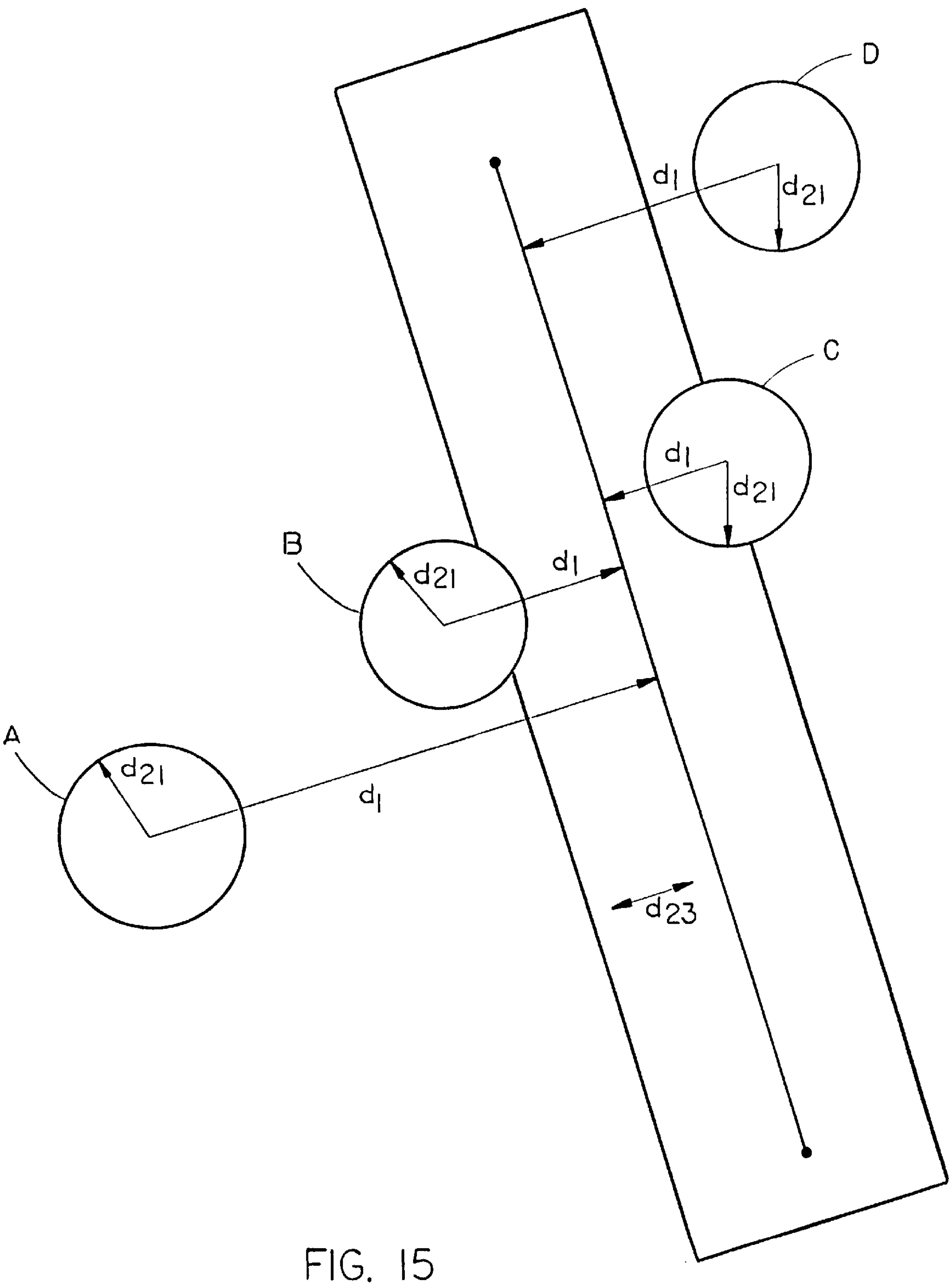

FIG. 14 shows a flow diagram for a preferred method of detecting a jurisdiction crossing event and is discussed in conjunction with FIG. 15. Although the jurisdictional border crossings will hereinafter be referred to as state line crossings for the sake of brevity, it will be understood by that the invention is equally applicable outside of the United States and will find utility in detecting any positional event, including local jurisdictional crossings, country borders, and even boundaries based on climate, elevation or other geographical or physical features. Similarly, the general approach, as depicted in FIG. 13, is to determine in which state the current position exists and determine if the current state is different from the last known state. If the states are different then a crossing must have occurred.

There are a series of calculations performed in the preferred embodiment of FIG. 15 to determine the current state, as well as ensure that the location of the detected crossing is accurate. Such issues as the magnitude of error associated with the GPS signal and other possible errors are considered when calculating the location of the crossing. Details of these calculations are provided in the FIG. 15.

Once a state line crossing has been detected, the state line crossing algorithm (SLCA) updates a global data structure that contains the current and old states, as well as other important data. The SLCA then notifies the host application that a crossing has been detected via returning True (>1=). The host application then reads the data in the global structure and record the necessary data. If a state line crossing is not detected, the SLCA returns a False (>0=).

The SLCA operates in two modes, initialization and detection. These modes are entered via a host application calling one of the two public routines that exist in the SLCA. Currently the SLCA is operated at 0.5 Hz.

Initialization mode is entered via the host application calling the "Init Crossing Detection" routine. This routine requires the address of the SLCA Boundary Database. The routine then initializes the various internal pointers used to extract data from the database. The database is currently compiled into the host application as a pre-initialized array.

Detection mode is entered via the host application calling the second public routine inside the SLCA, "State Crossing." This routine requires the current position and time data (i.e., the raw GPS data) converted to an appropriate format or data structures.

Once the SLCA receives the data structure it checks the GPS quality field to determine if the quality is acceptable (FOM <=6). If the quality is unacceptable (FOM >6), the SLCA returns a >0= to the host indicating no crossing. If the GPS quality is acceptable, the SLCA then checks the elapsed time since the last good set of data was received. If the elapsed time is more than 200 seconds the SLCA triggers a cold start internally. If the elapsed time is less than 200 seconds the SLCA executes the normal detection sequence.

After checking the quality of the GPS and the elapsed time, the SLCA then checks to see if the current location is in an area of ambiguity. If the current location is not in the area of ambiguity the SLCA then checks to see if the current state is the same as the last state, if they are not the SLCA returns TRUE to indicate a crossing has occurred.

The area of ambiguity is calculated using three different measurements of uncertainty.

This uncertainty is associated with the type of boundary points that are used to create the current boundary line in questions. This error is illustrated in FIG. 15 as distance $d_{22}$. There are three different types of points used to create the boundaries.

Political Point—A Political Point is a point along a known border that is non-meandering. The associated error of a Political Point is 0 meters.

Crossing Point—A Crossing Point is a known crossing. The associated error of a Crossing Point is 100 meters.

Supplemental Point—A Supplemental Point is located along a meandering border and is not located at a known crossing. The associated error of a supplemental point is 250 meters.

This uncertainty is obtained from the quality of the GPS, and is illustrated as $d_{21}$ in FIG. 15.

This uncertainty is the product of the elapsed time between valid GPS data and a default velocity value. Currently the default velocity value is 50 m/s.

The total distance of uncertainty is the sum of the uncertainties listed above. If the calculated distance from the current location to the boundary line is less than the distance of uncertainty the vehicle is said to be in the area of ambiguity.

During initialization the SLCA must be provided the address of the SLCA Boundary database, in order to initialize the SLCA=s internal variables prior to running in detection mode.

While running in detection mode, the SLCA is supplied with the current status data via an instance of a "Status Record" that is globally defined data structure. This data structure is then passed from the host application to the SLCA. The data that is contained in a "Status Record" data structure comprises, for example, Current Longitude/Latitude, Quality of the GPS signal, Odometer, Month/Day/Year/Hour/Minute/Second, Old State, New State.

The SLCA returns a Boolean value after each execution that indicates either a state line crossing has been detected or that one has not been detected. Prior to returning the boolean value, the SLCA modifies the appropriate date fields in the "Crossing Record" data structure.

Figure 16:
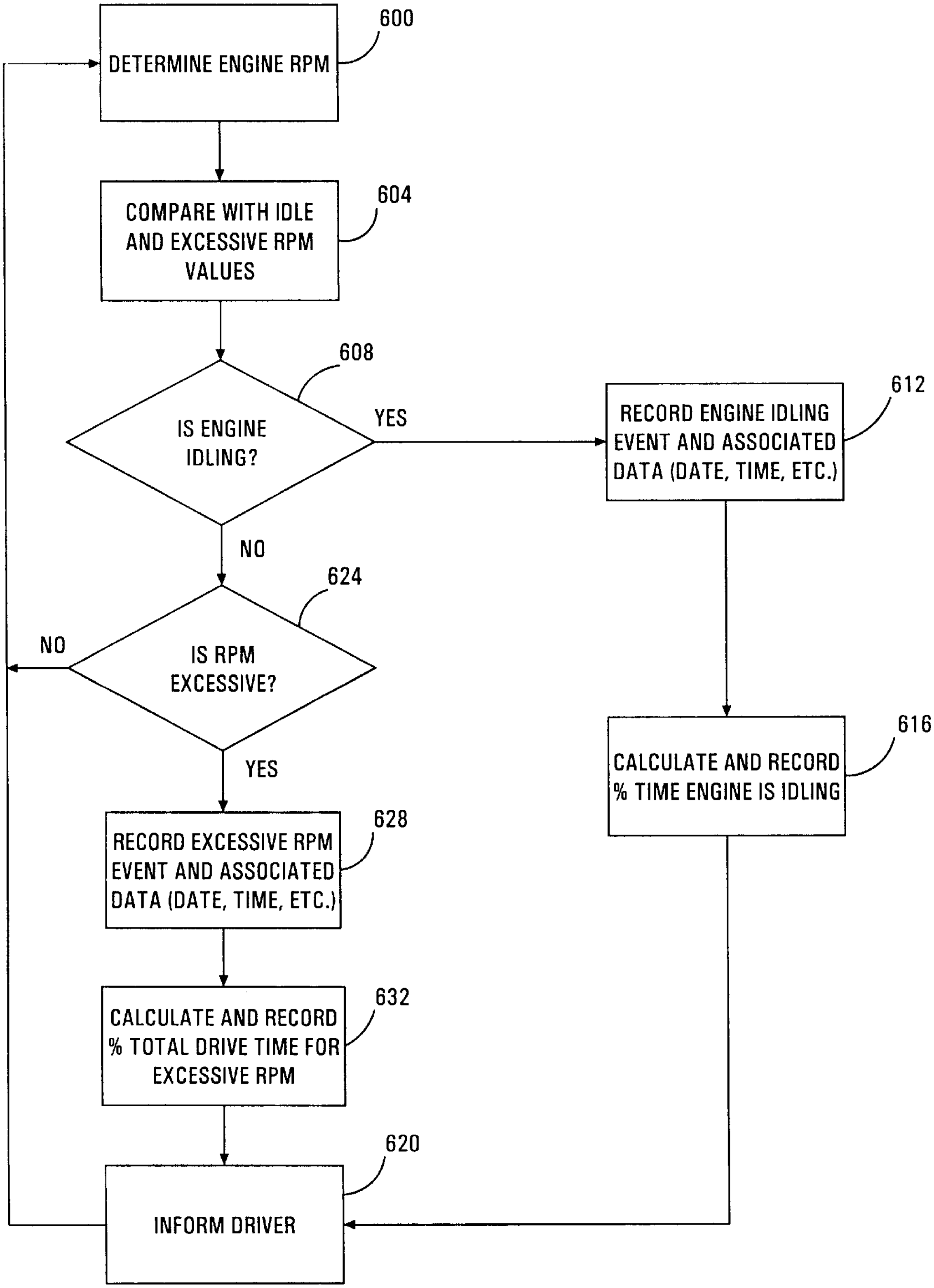
FIG. 16 shows a flow diagram for the monitoring and recording of engine RPM events.

FIG. 16 shows a flow diagram of a method for recording engine RPM events. Recording engine RPM events is useful in determining, for example, the amount of engine idle time, or alternatively, in determining drivers who subject a vehicle to excessive RPM. This parameter can be useful in driver evaluation and training and reducing engine and vehicle wear. In step 600, engine RPM is determined by a sensor interfaced with an on-board processor. The RPM value is compared RPM values stored in memory to determine if the RPM value is within a normal range, or whether the RPM is in a range of excessively high values, or within a range of low values indicating engine idle in step 604. In step 608, it is determined whether the engine is idling. If the engine is idling, an engine idle event is recorded in step 612 and the percentage of engine idle time is recorded in step 620 and the program returns to step 600 and repeats.

In step 624, if the engine is determine not to be idling in step 608, it is determined whether the RPM value is excessive. If not, the program returns to step 600 and repeats. If the RPM is in the excessive range, an excessive RPM event is recorded along with associated data in step 628. The percentage of total driving time during which the RPM value is in the excessive range is calculated, along with the total number of excessive RPM events, in step 632 and the driver is informed of the values in step 620 and the program returns to step 600 and repeats.

Figure 17:
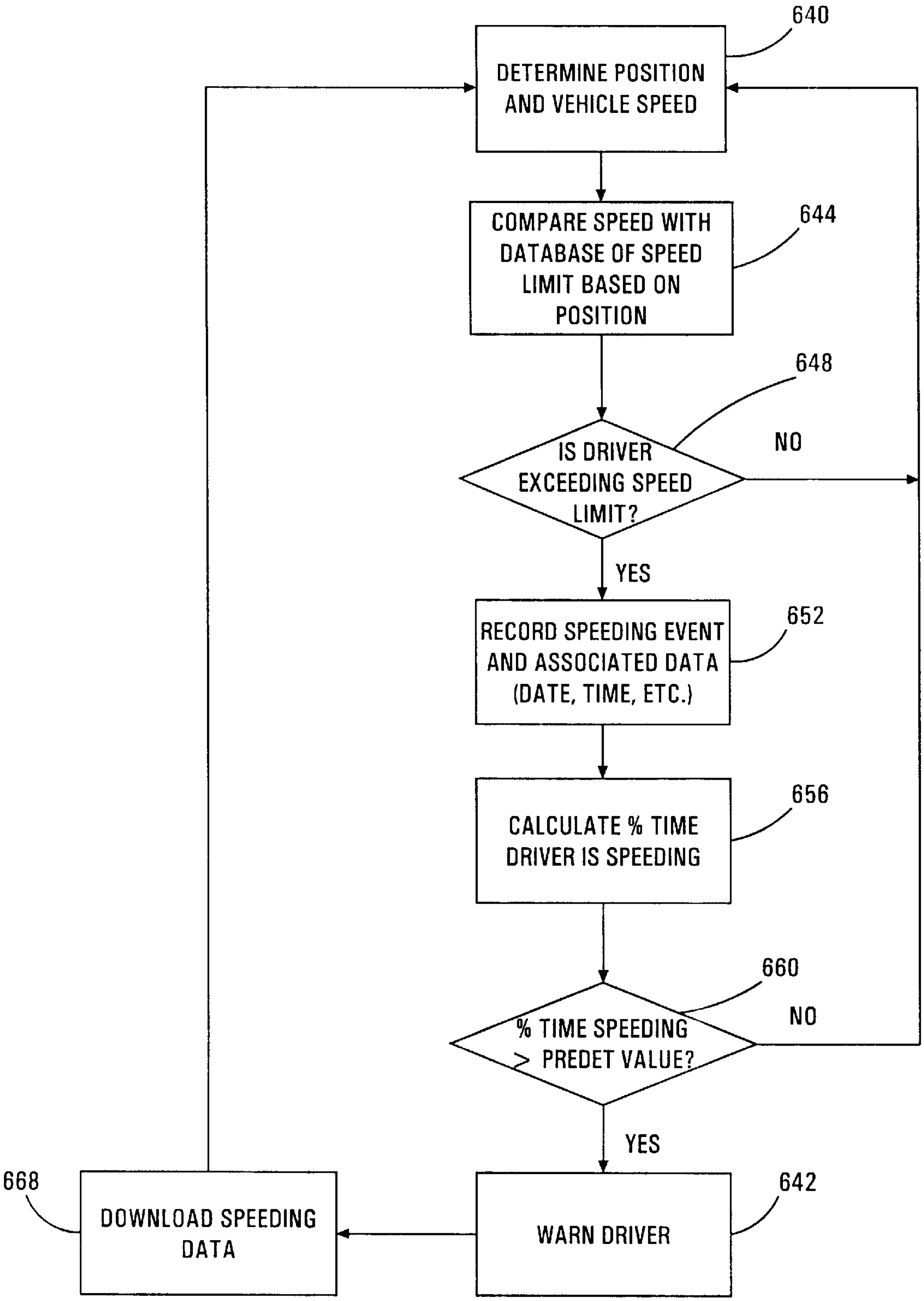
FIG. 17 shows a flow diagram for the monitoring and recording of vehicle speed events.

FIG. 17 shows a flow diagram of a method for monitoring vehicle speed. Vehicle speed is important in evaluating driver safety or fitness and compliance with posted speed limits, and is an important factor in fuel efficiency. In step 640, vehicle speed is determined via a sensor interfaced with an on-board processor, and position is determined by a positioning service such as a satellite positioning system or the like. In step 644, speed is compared with information stored in a database containing speed limits, e.g., the speed can be compared with the maximum allowable speed in the geo-cell in which a vehicle is located, or, alternatively, more detailed position specific speed limit data may be stored. In step 644, it is determined whether the driver is exceeding the maximum speed. If the driver is not exceeding the speed limit, the program returns to step 640 and repeats. If the driver is exceeding the maximum speed in step 648, a speeding event and associated data are recorded in step 652. The percentage of driving time during which the driver is speeding is calculated in step 656. In step 660, it is determined whether the percentage of time speeding exceeds a predetermined value. If the percentage of time speeding is below the preselected threshold, the program returns to step 640 and repeats. When the value in step 660 reaches the selected threshold, the driver is warned. Also, speed data is also downloaded to a central dispatch office periodically.

Figure 18:
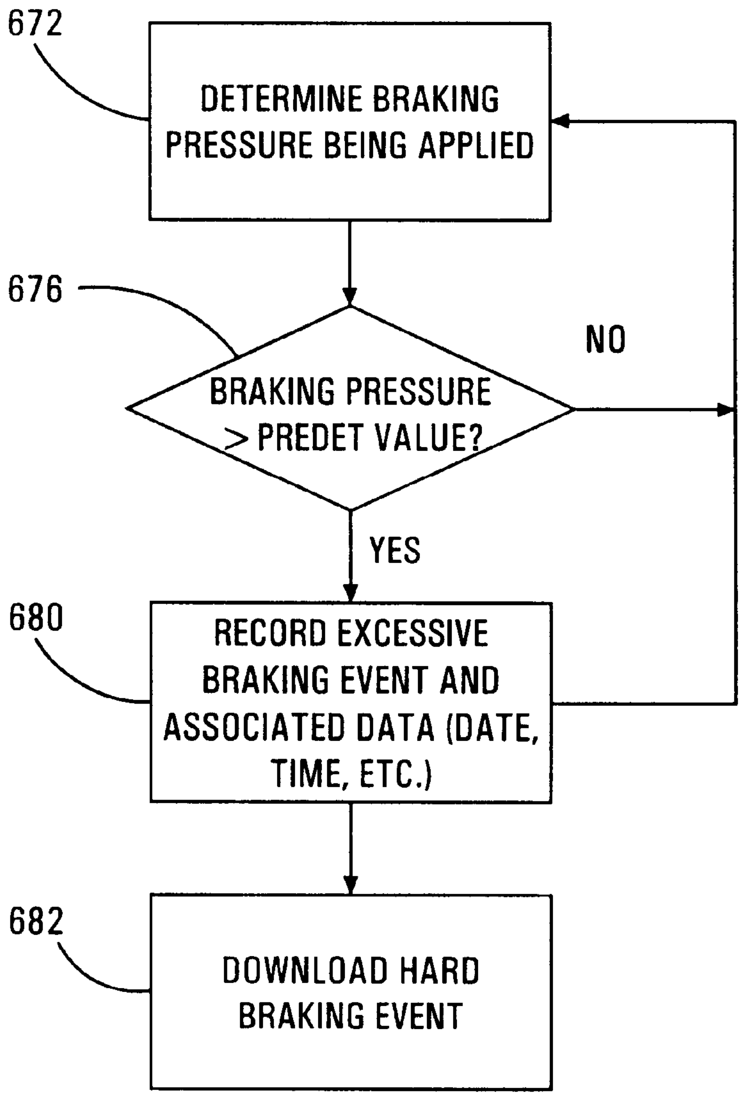
FIG. 18 shows a flow diagram for the monitoring and recording of hard braking events.
Figure 19:
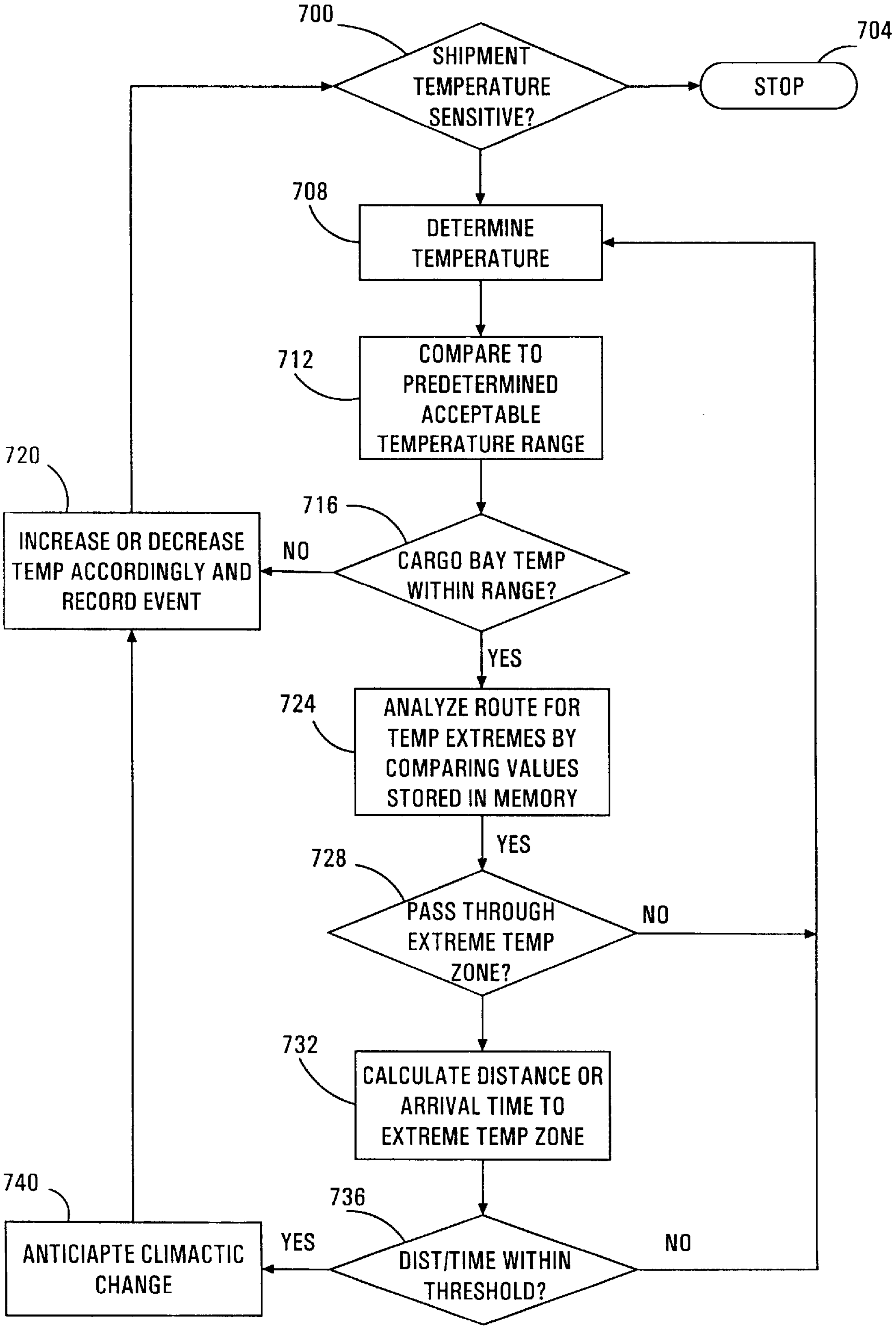
FIG. 19 shows a flow diagram depicting the ability of the present system to anticipate a temperature change and adjust the temperature of the freight hold accordingly.

FIG. 18 depicts a flow diagram for monitoring hard braking. This parameter is useful in evaluating drivers for safety or fitness for duty. For example, if a driver is makes an excessive number of hard brake applications, it may be an indication that the driver is operating the vehicle in an unsafe manner which may cause the driver to lose control of the vehicle of become involved in an accident. It may indicate, for example, that a driver follows other vehicles too closely or drives too fast. In step 672, the braking pressure being applied is determined, e.g., via a sensor interfaced with an on-board processor, e.g., brake fluid pressure, an accelerometer, brake pedal depression sensor, and the like. In step 676, it is determined whether the braking pressure being applied is greater than a predetermined threshold value. If the braking pressure in step 676 does not exceed the threshold, the program loops to step 672 and repeats. If the braking event exceeds the excessive value, an excessively hard braking event is recorded along with associated data and the program returns to step 672 and repeats.

Figure 20:
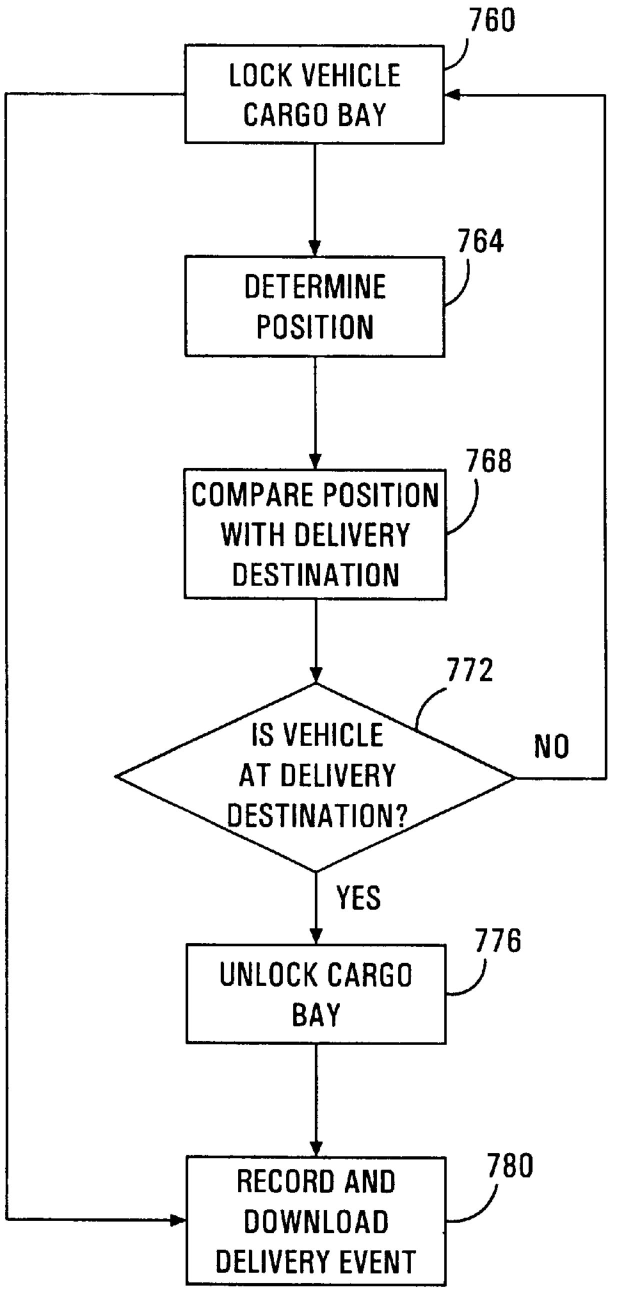
FIG. 20 shows a flow diagram depicting a security feature of the present invention.

FIG. 20 depicts a flow diagram of the temperature monitoring function according to the present invention. It is possible for a vehicle to traverse regions with vastly different climates, and the system according to the present invention allows anticipation of such changes along a given route. In step 700, it is determined whether the shipment is temperature sensitive. This may be determined, e.g., by user input, data download from the dispatch office, etc. If it is determined that the shipment is not temperature sensitive, the program ends at step 704 and no further inquiry is made until a new shipment is picked up. If the shipment is temperature sensitive, the temperature of the cargo bay or freight hold of the vehicle is determined via a sensor interfaced with an on-board computer in step 708. The determined temperature is compared to a predetermined acceptable temperature range in step 712. If the temperature is not within the prescribed value, the temperature is adjusted accordingly, e.g., via a thermostat device, in step 720. In a preferred embodiment, if the temperature is within the prescribed range, the route is analyzed in step 724 for geographical areas where a temperature extreme or drastically different temperature from the current temperature is likely, using geo-cell information stored in a database, e.g., climactic, seasonal, and positional data. In step 728, it is determined through route analysis whether the current route will pass through any areas of expected or likely large temperature differences. The data employed may be derived from geographical and optionally seasonal temperature gradients stored in memory, or actual reported temperatures may be downloaded and used. If the shipment is not likely to pass through an area of temperature extreme, then the program loops back to step 708. If the shipment is determined to be likely to pass through a region of extreme temperature in step 728, the distance or time until such an area is reached is calculated in step 732. If the distance or time until arrival in the region temperature extreme is not within a certain threshold value, the program loops ack to step 708. When the mileage or time until arrival to such a region is within a threshold value as determined in step 736, the temperature change is anticipated in step 740 and the temperature is increased or decreased accordingly (step 720).

FIG. 20 shows a flow diagram illustrating a security feature of the system according to the present invention whereby the cargo hold of a vehicle may be locked until the position data indicates that the vehicle is at the appropriate delivery destination. In step 760, the vehicle cargo bay is locked, e.g., at the start of a trip or immediately after loading. In step 764, the vehicle position is determined. In step 768, the vehicle position is compared with the delivery destination stored in memory. In step 772, it is determined whether the vehicle's current position is the same as the delivery destination. If the vehicle has not arrived that the delivery destination, the vehicle remains locked and the program returns to step 764. If the vehicle is at the delivery destination, the cargo bay is then unlocked for unloading. The delivery event is recorded in step 780 and stored for downloading in step 784.

Figure 21:
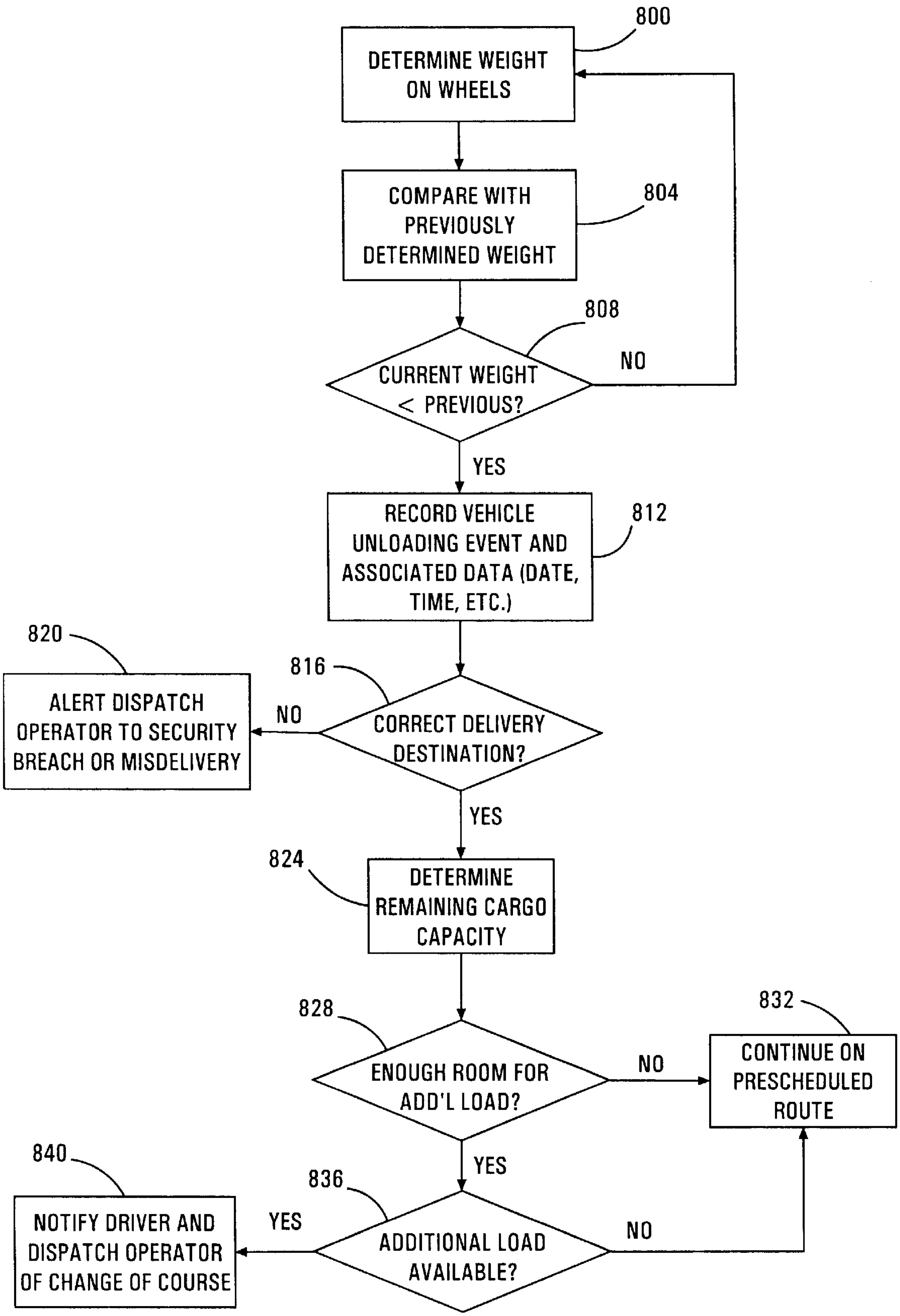
FIG. 21 shows a flow diagram depicting yet another security feature of the present invention.

FIG. 21 depicts a flow diagram showing a method for recording vehicle unloading events in accordance with a preferred embodiment according to the present invention. In step 800, the weight on wheels is calculated, e.g., via acoustic or laser measurement of spring compression. In step 804, the weight is compared with the previously determined weight. If the current weight is not less than the pervious weight (step 808), the program returns to step 800 and repeats. If the current weight is less than the previous weight, a vehicle unloading event and associated data such as time, date, position, is recorded in step 812. In step 816, it is determined whether the unloading event occurred at the correct delivery destination. If not, the dispatch office is alerted as to a potential misdelivery or security breach in step 820. If the delivery destination is correct in step 816, the remaining carrying capacity resulting from the unloading event is determined in step 824. If there is not enough room for an additional load in step 828, the driver is instructed to continue of prescheduled route in step 832. If there is room for an additional load in step 828, it is determined in step 836 whether there is a suitable additional load available. If not, the driver is instructed to continue of prescheduled route in step 832. if there is a suitable additional load available for pick up, the driver and dispatch operator are notified of a change of course in step 840. Upon loading of the new shipment, the program then starts again at step 800 and continues.

Figure 22:
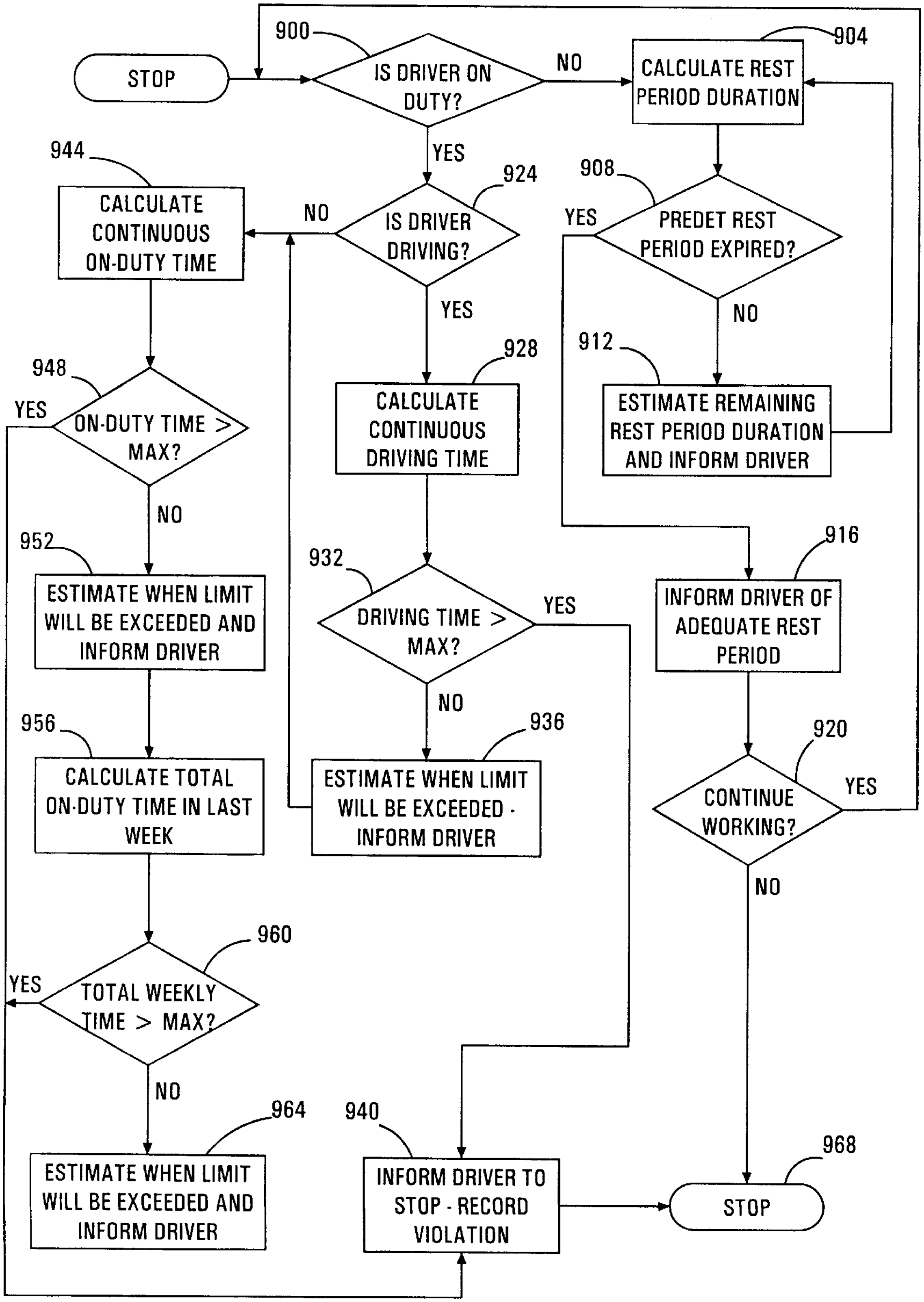
FIG. 22 shows a flow diagram depicting HOS compliance monitoring according to the present invention.

FIG. 22 shows a flow diagram demonstrating how the system according to the present invention can monitor and ensure compliance with HOS requirements. Typically drivers of commercial vehicles are subject to certain maximum hours of continuous driving time, continuous on-duty time (which included not only driving, but loading and unloading, waiting, performing administrative duties and the like). Such limits apply to both to a 24 hour period and to a period of consecutive days, such as the previous seven and/or eight days. Also, such periods usually depend on a sufficient preceding rest period. The diagram present is intended for illustrative purposes and may incorporate other factors such as exceptions based on vehicle weight, the particular industry and the like, and may be adapted to various regulatory changes as they are promulgated.

In step 900, it is determined whether the driver is on duty. If the driver is not on duty, the rest period duration is calculated in step 904. In step 908, it is determined whether the statutory resp period has been satisfied. If not, the estimated remaining time is calculated and the driver is informed in step 912. Upon expiration of an adequate rest period or off-duty time in step 908, the driver is informed in step 916. If the driver then decides to go on-duty in step 920, the program returns to step 900.

If the driver is on-duty (step 900), it is determined whether the driver is driving in step 924. If the driver is driving, the period of continuous driving time is calculated in step 928. If the continuous driving time has not exceeded the maximum allowable driving time, it is estimated in step 936 when the limit will be reached and the driver is informed. If the driver does exceed the maximum allowable time in step 932, the driver is told to stop and the violation is recorded in step 940.

If it is determined in step 924 that the driver is on-duty, but not driving, the continuous on-duty time is calculated. If the continuous on-duty time is determined to be within the allowable period in step 948, the time until the maximum on-duty time will be exceeded is estimated and the driver is informed in step 952. If the maximum continuous on-duty time is exceeded, the driver is informed and the violation is recorded in step 940.

In step 956, the total on-duty time in the past week (or alternatively, in the past eight days), is calculated. In step 960, it is determined if the total weekly on-duty time has been exceeded. If not, the estimated time remaining until a violation will occur is estimated and the driver informed in step 964. If the maximum has been exceeded, the driver is informed to stop and the violation is recorded in step 940.

It is apparent that the method of monitoring HOS compliance can readily be adapted to additional requirements such as mileage requirements and to accommodate the various regulatory exceptions.

The description above should not be construed as limiting the scope of the invention, but as merely providing illustrations to some of the presently preferred embodiments of this invention. In light of the above description, various other modifications and variations will now become apparent to those skilled in the art without departing from the spirit and scope of the present invention as defined by the appended claims. Accordingly, scope of the invention should be determined solely by the appended claims and their legal equivalents.

We claim:

1. A system for reporting vehicle fuel tax by jurisdiction, comprising:

a vehicle having a fuel reservoir from which fuel is consumed as an energy source;

a positioning system for generating present position information including latitude and longitude information of said vehicle;

an odometer for providing a signal representative of the mileage said vehicle has traveled since some predetermined event;

a fuel intake monitor for recording the quantity of fuel entering said vehicle fuel reservoir during a refueling operation and for determining the location of said vehicle during said refueling operation;

a memory device containing geographic information of the latitudes and longitudes of the boundaries of taxing jurisdictions;

a recording device for receiving and recording information; and, a processor, coupled with said positioning system, said odometer, said fuel intake monitor, said memory and said recording device for calculating vehicle fuel tax by jurisdiction.

2. The system of claim 1 wherein said positioning system is a global positioning system receiver.

3. The system of claim 1 wherein said positioning system is a LORAN receiver.

4. The system of claim 1 wherein said fuel intake monitor measures fuel mass changes in said fuel reservoir.

5. The system of claim 1 wherein said fuel intake monitor measures fuel volume changes in said fuel reservoir.

6. The system of claim 1 wherein said fuel intake monitor measures fuel pressure changes in said fuel reservoir.

7. The system of claim 1 wherein said fuel intake monitor measures fuel intake from fuel transaction records.

8. The system of claim 1 wherein said memory device is a read only memory.

9. The system of claim 1 wherein the recording device recorders current time, date, odometer mileage, fuel intake quantity, time and location, and said present position information when the vehicle crosses a state boundary.

10. The system of claim 9 further comprising an output port coupled with said recording device for downloading recorded information which can be used by taxing authorities and vehicle owners.

11. The system of claim 10 wherein said system further comprises a reporter for automatically reporting vehicle information.

* * * * *